US009628744B2

(12) United States Patent
Phang et al.

(10) Patent No.: US 9,628,744 B2
(45) Date of Patent: Apr. 18, 2017

(54) DISPLAY APPARATUS AND CONTROL METHOD THEREOF

(71) Applicant: SAMSUNG ELECTRONICS CO., LTD., Suwon-si (KR)

(72) Inventors: Joon-ho Phang, Seoul (KR); Joo-sun Moon, Seoul (KR); Yi-sak Park, Seoul (KR); Sue-young Chung, Seoul (KR); Nam-hyun Park, Suwon-si (KR); Mi-jin Choi, Seoul (KR); Christopher E. Bangle, Clavesana CN (IT)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 247 days.

(21) Appl. No.: 14/274,211

(22) Filed: May 9, 2014

(65) Prior Publication Data

US 2014/0333671 A1 Nov. 13, 2014

(30) Foreign Application Priority Data

May 10, 2013 (KR) ........................ 10-2013-0053447

(51) Int. Cl.
*G06F 3/03* (2006.01)
*G09F 19/02* (2006.01)
(Continued)

(52) U.S. Cl.
CPC ....... *H04N 5/44591* (2013.01); *G06F 1/1622* (2013.01); *G06F 3/017* (2013.01);
(Continued)

(58) Field of Classification Search
CPC ........... G06F 3/0362; G06F 2200/1614; G06F 3/017; G06F 1/1622; G09G 2340/0492; G09F 11/025; G09F 19/02
See application file for complete search history.

(56) References Cited

U.S. PATENT DOCUMENTS

| | | | | |
|---|---|---|---|---|
| 6,897,882 | B1 * | 5/2005 | Kim | ........................ G09G 5/36 345/649 |
| 7,559,834 | B1 | 7/2009 | York | |

(Continued)

FOREIGN PATENT DOCUMENTS

| | | |
|---|---|---|
| JP | 2008017373 A | 1/2008 |
| KR | 1020070041224 A | 4/2007 |
| KR | 1020110026811 A | 3/2011 |

OTHER PUBLICATIONS

Communication (Search Report) date Aug. 26, 2014, issued by the International Searching Authority in counterpart International Application No. PCT/KR2014/004137.
(Continued)

*Primary Examiner* — Jeffrey Chow
(74) *Attorney, Agent, or Firm* — Sughrue Mion, PLLC

(57) ABSTRACT

A display apparatus and a method for controlling a display apparatus are provided. A display apparatus includes a display configured to display an image, a rotator configured to rotate the display, and a controller configured to control the rotator to rotate the display when a predetermined event occurs, and control the display to generate a plurality of screens on the rotated display, display a first image on one of the plurality of screens, and display at least one different image on another screen among the plurality of screens.

40 Claims, 39 Drawing Sheets

(51) Int. Cl.
  *H04N 5/445* (2011.01)
  *G06F 3/01* (2006.01)
  *G06F 3/0362* (2013.01)
  *G06F 1/16* (2006.01)
  *H04N 5/64* (2006.01)
  *H04N 21/431* (2011.01)
  *H04N 21/426* (2011.01)
  *G09F 11/02* (2006.01)
  *H04N 21/422* (2011.01)
  *H04N 21/442* (2011.01)

(52) U.S. Cl.
  CPC ............. *G06F 3/0362* (2013.01); *H04N 5/64* (2013.01); *H04N 21/426* (2013.01); *H04N 21/4316* (2013.01); *G06F 2200/1614* (2013.01); *G09F 11/025* (2013.01); *G09F 19/02* (2013.01); *H04N 21/42224* (2013.01); *H04N 21/44218* (2013.01)

(56) References Cited

U.S. PATENT DOCUMENTS

| | | | |
|---|---|---|---|
| 7,844,301 B2 | 11/2010 | Lee et al. | |
| 8,566,075 B1* | 10/2013 | Bruner | H04N 21/23433 704/2 |
| 2004/0012724 A1* | 1/2004 | Jang | G09G 3/20 348/739 |
| 2006/0253330 A1* | 11/2006 | Maggio | G06Q 30/02 705/14.2 |
| 2007/0085759 A1 | 4/2007 | Lee et al. | |
| 2008/0074442 A1 | 3/2008 | Taniguchi et al. | |
| 2009/0116414 A1* | 5/2009 | Or | H04M 3/493 370/276 |
| 2010/0061041 A1* | 3/2010 | Chen | F16M 11/08 361/679.01 |
| 2010/0265401 A1 | 10/2010 | Yuki | |
| 2010/0295782 A1* | 11/2010 | Binder | G01S 3/7864 345/158 |
| 2011/0154406 A1 | 6/2011 | Koo et al. | |
| 2011/0249074 A1* | 10/2011 | Cranfill | H04N 7/147 348/14.02 |
| 2012/0081280 A1 | 4/2012 | Schrock et al. | |
| 2012/0167136 A1* | 6/2012 | Yuen | H04N 5/44543 725/36 |
| 2012/0331496 A1* | 12/2012 | Copertino | H04N 21/25866 725/14 |
| 2013/0182014 A1* | 7/2013 | Park | G09G 5/00 345/649 |

OTHER PUBLICATIONS

Communication (Written Opinion) date Aug. 26, 2014, issued by the International Searching Authority in counterpart International Application No. PCT/KR2014/004137.
Communication dated Sep. 22, 2016 issued by the European Patent Office in counterpart European Patent Application No. 14794467.2.
Communication dated Feb. 7, 2017 issued by the European Patent Office in counterpart European Patent Application No. 14 794 467.2.

* cited by examiner

DISPLAY APPARATUS AND CONTROL METHOD THEREOF

CROSS-REFERENCE TO RELATED APPLICATION

This application claims priority from Korean Patent Application No. 10-2013-0053447, filed on May 10, 2013 in the Korean Intellectual Property Office, the disclosure of which is incorporated herein by reference in its entirety.

BACKGROUND

1. Field

Apparatuses and methods consistent with exemplary embodiments relate to a display apparatus and a control method thereof, and more particularly, to a display apparatus which can rotate a display and display images on a plurality of screens of the display of a vertical direction, and a control method thereof.

2. Description of the Related Art

A related-art display apparatus has a rectangular shape whose width is longer than its height. Such a display apparatus of a rectangular shape whose width is longer than its height displays a single image wide such that a more realistic image can be provided. However, when such a rectangular display apparatus provides a plurality of images by dividing a display screen, an aspect ratio of the image may be distorted or vividness of the image may deteriorate.

On the other hand, as communication technologies have been developed and users' demands have been diversified, recent display apparatuses may provide various additional functions for a single image, However, users using a related-art display apparatus should hide a part of the screen or should change the screen in order to perform the additional services for the image while viewing the image. That is, there is a problem that the user cannot keep viewing the image that he/she has viewed when using the additional services.

Therefore, there is a need for a method for displaying a current image continuously without distorting it, and providing various services related to the image. Also, there is a need for a method for displaying a content whose height is longer than its width without distorting an image.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

An aspect of one or more exemplary embodiments relates to a display apparatus and a method for controlling a display apparatus.

A display apparatus includes a display configured to display an image, a rotator configured to rotate the display, and a controller configured to control the rotator to rotate the display when a predetermined event occurs, and control the display to generate a plurality of screens on the rotated display, display an image on one of the plurality of screens, and display at least one different image on another screen among the plurality of screens. The controller may be configured to control the rotator to rotate the display in response to the predetermined event occurs only while the display displays the image. The controller may be configured control the display to display the at least one different image on another screen among the plurality of screens according to attributes of the image. The at least one different image may be related to the image.

The controller may control the display to display an image on one of the plurality of screens, and display an image including information related to the image on another screen among the plurality of screens.

The information related to the image may include at least one of detailed information on the image, detailed information on a character included in the image, and shopping information on a product which is shown in the image.

The controller may control the display to display an image of image content from a first camera on one of the plurality of screens, and display an image of the image content from a second camera on another screen among the plurality of screens.

When the displayed image is an image regarding a sports game, the controller may control the display to display the sports game image on a first screen among the plurality of screens, display real-time analysis information of the sports game on a second screen among the plurality of screens, and display SNS (Social Network Service) information on the sports game on a third screen among the plurality of screens.

The controller may control the display to display the image on a first screen among the plurality of screens, display a chatting screen on a second screen among the plurality of screens, and display a video call screen on a third screen among the plurality of screens.

The controller may control the display to display an image on one of the plurality of screens, and display a sign language image corresponding to the image on another screen among the plurality of screens.

When the displayed image is an image regarding a cooking program, the controller may control the display to display an image of the cooking program on one of the plurality of screens, and display recipe information corresponding to the cooking program on another screen among the plurality of screens.

When the displayed image is a broadcast program image where audience participation is available, the controller may control the display to display the broadcast program image on one of the plurality of screens, and display an audience participation image on another screen among the plurality of screens.

When the displayed image is a game image regarding a video game, and if the event is a second participant beginning participation while a first participant participates in the video game, the controller may control the rotator to rotate the display by an angle of a predetermined degree, and control the display to generate a plurality of screens on the rotated display, display an image of the video game performed by the first participant on one of the plurality of screens, and display an image of the video game performed by the second participant on another screen among the plurality of screens.

The plurality of screens may be arranged in a vertical direction, and a position and a size of the plurality of screens may be set by a user.

When a predetermined event occurs while the display displays an image, the controller may control the rotator to rotate the display by an angle of a predetermined degree.

When the predetermined event occurs, the controller may control the rotator to rotate the display by 90 degrees.

The controller may control the display to reduce a size of an image which is displayed on the display with maintaining horizontality of the image while the display is rotated.

A method for controlling a display apparatus includes rotating the display when a predetermined event occurs, and generating a plurality of screens on the rotated display, displaying an image on one of the plurality of screens, and displaying at least one different image on another screen among the plurality of screens. The rotating the display may only occur while the display displays the image. The displaying the at least one different image on another screen among the plurality of screens occurs according to attributes of the image. The at least one different image may be related to the image.

The displaying may include displaying the image on one of the plurality of screens, and displaying an image including information related to the image on another screen among the plurality of screens.

The information related to the image may include at least one of detailed information on the image, detailed information on a character included in the image, and shopping information on a product shown in the image.

The displaying may include displaying an image of image content from a first camera on one of the plurality of screens, and displaying an image of the image content from a second camera on another screen among the plurality of screens.

When the displayed image is an image regarding a sports game, the displaying may include displaying the sports game image on a first screen among the plurality of screens, displaying real-time analysis information on the sports game on a second screen among the plurality of screen, and displaying SNS (Social Network Service) information on the sports game on a third screen among the plurality of screens.

The displaying may include displaying the image on a first screen among the plurality of screens, displaying a chatting image on a second screen among the plurality of screens, displaying a video call image on a third screen among the plurality of screens.

The displaying may include displaying an image on one of the plurality of screens, and displaying a sign language image corresponding to the image on another screen among the plurality of screens When the displayed image is a cooking program image regarding a cooking program, the displaying may include displaying the cooking program image on one of the plurality of screens, and displaying recipe information corresponding to the cooking program on another screen among the plurality of screens.

When the displayed image is a broadcast program image regarding a broadcasting program where audience participation is available, the displaying may include displaying the broadcast program image, and displaying an audience participation image regarding the broadcasting service where audience participation is available on another screen among the plurality of screens.

When the displayed image is a game image regarding a video game, and if an event in which a second participant begins participating in the video game while a first participant participates in the video game, the displaying may include controlling the rotator to rotate the display by an angle of a predetermined degree, generating a plurality of screens on the rotated display, displaying a game image of the video game in which the first participant participates on one of the plurality of screens, and displaying a game image of the video game in which the second participant participates on another screen among the plurality of screens.

The plurality of screens may be arranged in a vertical direction, and a position and a size of the plurality of screens may be set by a user.

The rotating may include rotating the display by an angle of a predetermined degree.

The rotating may include rotating the display by 90 degrees.

The rotating may include rotating the display with reducing a size of an image which is displayed on the display and maintaining the horizontality of the image while the display is rotated.

A display apparatus includes a display configured to display an image, a rotator configured to rotate the display, a user interface unit configured to receive a user interaction, and a controller configured to control the rotator to rotate the display when a predetermined user interaction is received from the user interface unit, and control the display to generate a plurality of screens on the rotated display, display an image on one of the plurality of screens, and display at least one different image on another screen among the plurality of screens. The controller may be configured to control the rotator to rotate the display in response to the predetermined event occurs only while the display displays the image. The controller may be configured control the display to display the at least one different image on another screen among the plurality of screens according to attributes of the image. The at least one different image may be related to the image.

A method for controlling a display apparatus includes rotating the display when a predetermined user interaction is received, and generating a plurality of screens on the rotated display, displaying an image on one of the plurality of screens, and displaying at least one different image on another screen among the plurality of screens. The rotating the display may only occur while the display displays the image. The displaying the at least one different image on another screen among the plurality of screens occurs according to attributes of the image. The at least one different image may be related to the image.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Figure 1:
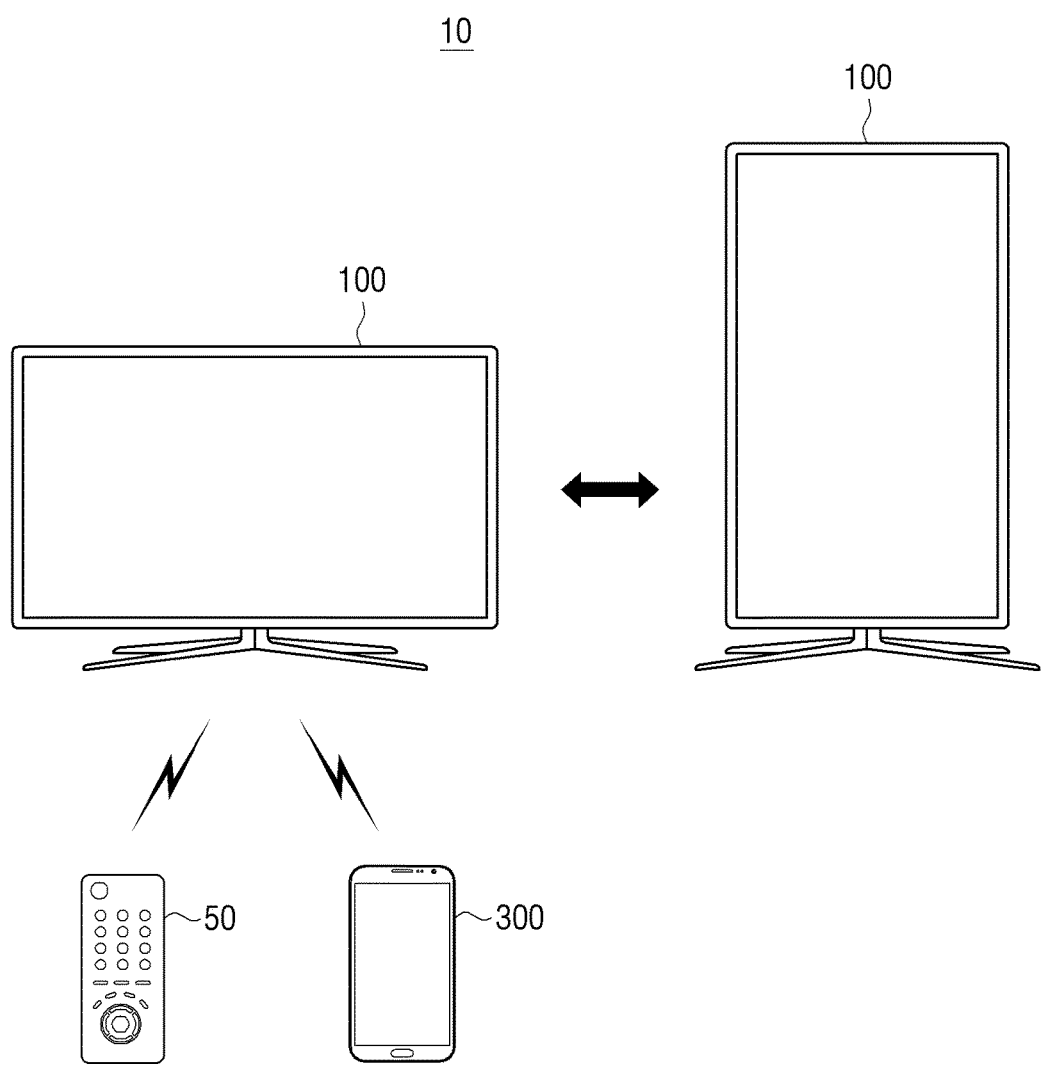
FIG. 1 is a view illustrating a display system according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a view to illustrate a display system according to an exemplary embodiment. Referring to FIG. 1, a display system 10 according to an exemplary embodiment includes a display apparatus 100, a remote control apparatus 50, and a mobile apparatus 300.

The display apparatus 100 may be implemented by using a digital television (TV) as shown in FIG. 1. However, this should not be considered as limiting and the display apparatus 100 may be implemented by using various kinds of apparatuses equipped with a display function, such as a monitor and a projection TV. When the display apparatus 100 is implemented by using a digital TV, the display apparatus 100 may be controlled by the remote control apparatus 50. In this case, the remote control apparatus 50 is an apparatus for controlling the display apparatus 100 remotely and may receive a user interaction and transmit a control signal corresponding to the input user interaction to the display apparatus 100. For example, the remote control apparatus 50 may sense a motion of the remote control apparatus 50 and transmit a signal corresponding to the sensed motion, may recognize a voice and transmit a signal corresponding to the recognized voice, or may transmit a signal corresponding to an input key.

Also, the display apparatus 100 may operate in association with the mobile apparatus 300. For example, the display apparatus 100 may receive a specific content or a control command from the mobile apparatus 300. Also, the display apparatus 100 may provide a mirroring function to display contents displayed on the mobile apparatus 300.

In particular, when a predetermined event occurs, the display apparatus 100 may rotate a display such that a display of a rectangular shape whose width is longer than its height (hereinafter, referred to as a display of a horizontal direction) is changed to a display of a rectangular shape whose height is longer than its width (hereinafter, referred to as a display of a vertical direction). In particular, when a predetermined event occurs while a first image is displayed on the display in the horizontal direction, the display apparatus 100 may rotate the display to be in the vertical direction, generate a plurality of screens on the display in the vertical direction, display the first image on one of the plurality of screens, and display a second image related to the first image on another screen among the plurality of screens. Hereinafter, a detailed configuration of the display apparatus 100 according to various exemplary embodiments will be explained.

Figure 2:
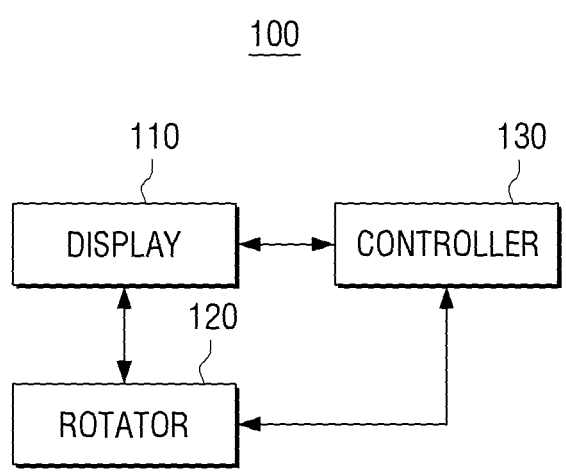
FIG. 2 is a block diagram schematically illustrating a configuration of a display apparatus according to an exemplary embodiment.

FIG. 2 is a block diagram illustrating a configuration of a display apparatus according to an exemplary embodiment.

Referring to FIG. 2, the display apparatus 100 includes a display 110, a rotator 120, and a controller 130.

The display 110 outputs image data or a user interface (UI) which is received from an external source or pre-stored under the control of the controller 130. Also, the display 110 may be placed in the horizontal direction or vertical direction under the control of the controller 130.

Specifically, when a predetermined event occurs while the display 110 is placed in the horizontal direction, the display 110 may be rotated by the rotator 120 such that the display 110 may be placed in the vertical direction. When the display 110 is rotated to be in the vertical direction while the display 110 in the horizontal direction displays the first image, the display 110 may generate a plurality of screens on the display screen, display the first image on one of the plurality of screens, and display a second image related to the first image on another screen of the plurality of screens. For example, the display 110 in the vertical direction may display a broadcasting image on one of the plurality of screens, and may display another image related to the broadcasting image on another screen among the plurality of screens.

The rotator 120 rotates the display 110 under the control of the controller 130. In particular, when a predetermined event occurs, the rotator 120 may rotate the display 110 in the horizontal direction by 90 degrees such that the display 110 in the horizontal direction becomes the display 110 in the vertical direction.

The controller 130 controls an overall operation of the display apparatus 100. In particular, when a predetermined event occurs while the display 110 displays a first image, the controller 130 may control the rotator 120 to rotate the display 110 by a predetermined angle. The controller 130 may control the display 110 to generate a plurality of screens on the rotated display 110, display the first image on one of the plurality of screens, and display at least one second image related to the first image on another screen among the plurality of screens according to attributes of the first image. The predetermined event may be an event in which the user directly inputs a user interaction, or may be an event in which the display apparatus 100 senses a predetermined condition without receiving user input. The event in which the user directly inputs the user interaction may include an event in which a user interaction is sensed in a predetermined area of a remote controller, an event in which a predetermined user motion is photographed by a camera, an event in which a predetermined user voice is input through a microphone, and an event in which a predetermined user touch is input to a touch sensor provided on a bezel of the display 110. The event in which the display apparatus 100 senses the predetermined condition without receiving user input may include an event in which a content of a predetermined condition is displayed on the mobile apparatus 300 while the mirroring function is performed, an event in which a specific game is executed, an event in which a user motion is sensed in a specific mode (for example, a sleep mode), and an event in which the display apparatus 100 is connected to an external apparatus (for example, a refrigerator, etc.)

In particular, the controller 130 may process the first image such that the first image displayed on the display 110 is reduced with horizontality being maintained, while the display 110 is rotated.

In particular, when the display 110 in the horizontal direction displays the first image, the controller 130 may display the image and information on the image on the display 110 in the vertical direction altogether. Specifically, when a predetermined event is sensed while the display 110 in the horizontal direction displays the first image, the controller 130 may control the rotator 120 to rotate the display 110 in the horizontal direction to be in the vertical direction. The controller 130 may control the display 110 to generate a plurality of screens on the display 110 in the vertical, display the first image on one of the plurality of screens, and display an image including information on the first image on another screen among the plurality of screens. The information on the first image may include at least one of detailed information on the first image (for example, story, cast, playback information, and relevant works), detailed information on a cast included in the first image, and shopping information on a product which is shown in the first image.

The controller 130 may display images which are photographed for the same content by various cameras on the display 110 in the vertical direction simultaneously. Specifically, when a predetermined event occurs when the display 110 in the horizontal direction displays an image that is photographed by using a first camera, the controller 130 may control the rotator 120 to rotate the display 110 in the horizontal direction to be in the vertical direction. Also, the controller 130 may control the display 110 to generate a plurality of screens on the display 110 in the vertical direction, display an image of an image content that is photographed by using a first camera on one of the plurality of screens, and display an image of an image content that is photographed by using a second camera on another screen among the plurality of screens.

Also, when the image displayed on the display 110 in the horizontal direction is a sports image, the controller 130 may display the sports image and an image for providing a service related to the sports image on the display 110 in the vertical direction. Specifically, when a predetermined event is sensed while the display 110 in the horizontal direction displays the sports image, the controller 130 may control the rotator 120 to rotate the display 110 in the horizontal direction to be in the vertical direction. The controller 130 may control the display 110 to generate a plurality of screens on the display 110 in the vertical direction, display the sports image on a first screen among the plurality of screens, display a real-time analysis information image regarding the sports image on a second screen among the plurality of screens, and display social network service (SNS) information on the currently displayed sports image on a third screen among the plurality of screens.

Also, when the display apparatus 100 provides an external chatting function or a video call function, the controller 130 may display an image, a chatting window, and a video call image on the display 110 in the vertical direction. Specifically, when a predetermined event is sensed while the display 110 in the horizontal direction displays a first image, the controller 130 may control the rotator 120 to rotate display 110 in the horizontal direction to be in the vertical direction. Also, the controller 130 may control the display 110 to generate a plurality of screens on the display 110 in the vertical direction, display a first image on a first screen among the plurality of screens, display a chatting screen on a second screen among the plurality of screens, and display a video call image on a third screen among the plurality of screens. Accordingly, the user may chat or make a video call with other people while viewing the image.

Also, the controller 130 may display an image and a sign language image corresponding to a sound output from the current image on the display 110 in the vertical direction altogether. Specifically, when a predetermined event is sensed while the display 110 in the horizontal direction displays a first image, the controller 130 may control the rotator 120 to rotate the display 110 in the horizontal direction to be in the vertical direction. Also, the controller 130 may control the display 110 to generate a plurality of screens on the display 110 in the vertical direction, display the first image on one of the plurality of screens, and display a sign language image related to the first image on another screen among the plurality of screens.

When the image displayed on the display 110 in the horizontal direction is a cooking program image, the controller 130 may display recipe information on the cooking program as well as the cooking program image on the display 110 in the vertical direction. Specifically, when a predetermined event is sensed while the display 110 in the horizontal direction displays a cooking program image, the controller 130 may control the rotator 130 to rotate the display 110 in the horizontal direction to be in the vertical direction. Also, the controller 130 may control the display 110 to generate a plurality of screens on the display 110 in the vertical direction, display the cooking program image on one of the plurality of screens, and display the recipe information on a food that is currently provided in the cooking program on another screen among the plurality of screens.

When the image displayed on the display 110 in the horizontal direction is an image on a broadcasting program where audience participation is available, the controller 130 may display the broadcasting program and an image regarding the broadcasting service where audience participation is available on the display 110 in the vertical direction. Specifically, when a predetermined event is sensed while the display 110 in the horizontal direction displays an image of a quiz program where audience participation is available, the controller 130 may control the rotator 120 to rotate the display 110 in the horizontal direction to be in the vertical direction. Also, the controller 130 may control the display 110 to generate a plurality of screens on the display 110 in the vertical direction, display the quiz program image on one of the plurality of screens, and display an audience participation image on another screen among the plurality of screens.

When the image displayed on the display 110 in the horizontal direction is a game image, the controller 130 may display game images of a plurality of participants on the display 110 in the vertical direction simultaneously. Specifically, while a first participant performs a game, when an event in which a second participant participates in the same game occurs, the controller 130 may control the rotator 120 to rotate the display 110 by a predetermined angle. The controller 130 may control the display 110 to generate a plurality of screens on the rotated display 110, display an image of the game which is performed by the first participant on one of the plurality of screens, and display an image of the game which is performed by the second participant on another screen among the plurality of screens.

According to the various exemplary embodiments described above, the user may be provided with information related to the image or another image as well as the image which has been displayed before through the display in the vertical direction.

Figure 3:
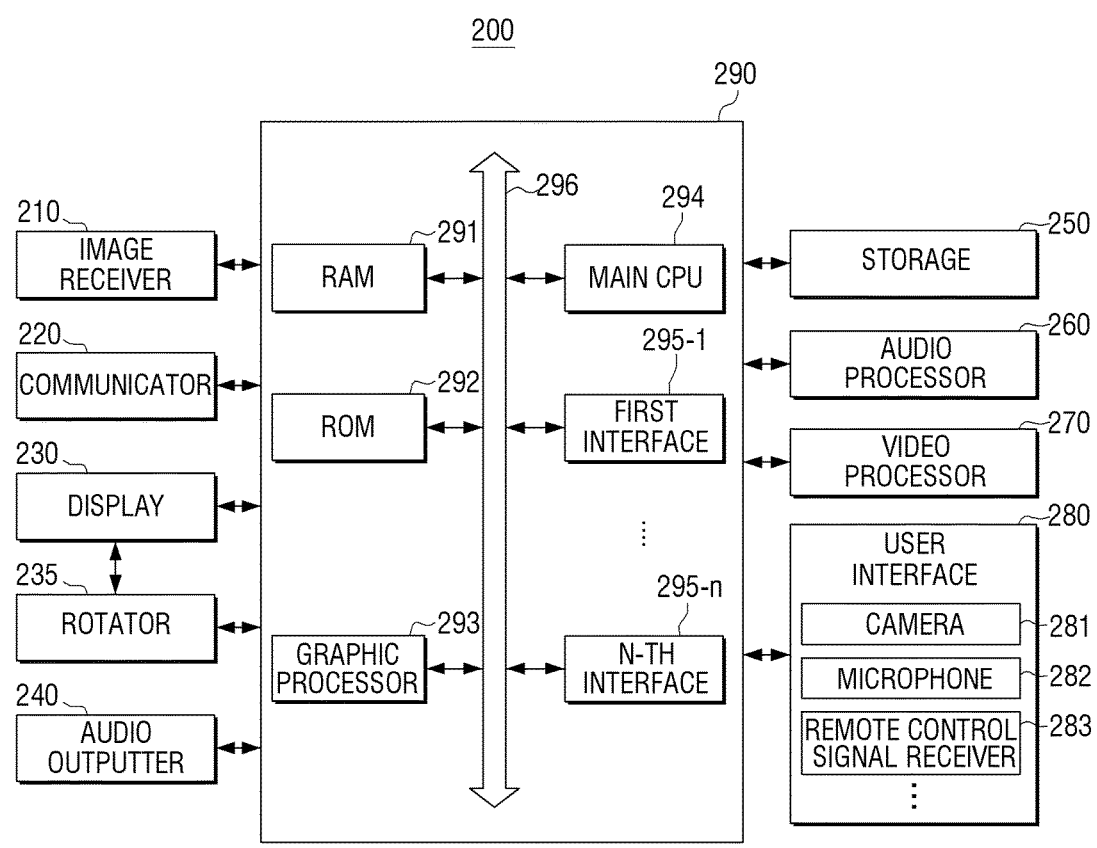
FIG. 3 is a block diagram illustrating a configuration of a display apparatus in detail according to an exemplary embodiment.

FIG. 3 is a block diagram illustrating a configuration of a display apparatus in detail according to another exemplary embodiment. As shown in FIG. 3, a display apparatus 200 according to another exemplary embodiment includes an image receiver 210, a communicator 220, a display 230, a rotator 235, an audio outputter 240, a storage 250, an audio processor 260, a video processor 270, a user interface 280, and a controller 290.

The image receiver 210 receives image data via various sources. For example, the image receiver 210 may receive broadcasting data from an external broadcasting station, may receive image data from an external apparatus (for example, a DVD or BD player, etc.), or may receive image data stored in the storage 250. In particular, the image receiver 210 may include a plurality of image receiving modules to display a plurality of screens on a single display screen. For example, the image receiver 210 may include a plurality of tuners to display a plurality of broadcasting channels simultaneously.

The communicator 220 is configured to communicate with various kinds of external apparatuses or external servers according to various kinds of communication methods. The communicator 220 may include various communication chips such as a Wi-Fi chip, a Bluetooth chip, a near field communication (NFC) chip, and a wireless communication chip. The Wi-Fi chip, the Bluetooth chip, and the NFC chip communicate with external apparatuses in a Wi-Fi method, a Bluetooth method, and an NFC method, respectively. Among these, the NFC chip communicates in the NFC method, which uses 13.56 MHz from among various RF-ID frequency bands such as 135 kHz, 13.56 MHz, 433 MHz, 860~960 MHz, and 2.45 GHz. When the Wi-Fi chip or the Bluetooth chip is used, a variety of connection information such as an SSID and a session key is exchanged first and connection is established using the connection information, and then, a variety of information is exchanged. The wireless communication chip communicates with external apparatuses according to various communication standards such as IEEE, Zigbee, 3rd generation (3G), 3rd generation partnership project (3GPP), and long term evolution (LTE).

The display 230 displays a video frame which is a result of processing, by the video processor 270, the image data received by the image receiver 210, and at least one of various screens which are generated by a graphic processor 293. In particular, the display 230 may be rotated by the rotator 235. Specifically, the display 230 in the horizontal direction may be rotated by the rotator 235 by 90 degrees such that the display 230 is placed in the vertical direction. Also, when the display 230 in the horizontal direction displays a first image, and the display 230 is rotated to be in the vertical direction in the meantime, the display 230 in the vertical direction may generate a plurality of screens on the display screen, display the first image on one of the plurality of screens, and a second image related to the first image on another screen among the plurality of screens.

As non-limiting examples, display 230 may be implemented by using a liquid crystal display (LCD) or an organic light emitting diode (OLED). Also, as non-limiting examples, the display 230 may be implemented by using a flexible display or a transparent display according to circumstances. Also, as non-limiting examples, the display 230 may be implemented as a touch screen to sense a user's interaction.

According to an exemplary embodiment, the display 230 may include a display panel, and a bezel to house the display panel. In particular, according to an exemplary embodiment, the bezel may include a sensor (not shown), such as a touch sensor (not shown) or a motion detector (not shown), to sense a user interaction.

The rotator 235 rotates the display 230 under the control of the controller 290. Specifically, when a predetermined event occurs, the rotator 235 may rotate the display 230, as a non-limiting example, by 90 degrees such that the display 230 in the horizontal direction becomes the display 230 in the vertical direction.

Also, the rotator 235 may rotate the display 230 according to a direction of a user interaction. For example, when a user interaction of a clockwise direction is input, the rotator 235 may rotate the display 230 in the clockwise direction.

Also, according to an exemplary embodiment, the rotator 235 may rotate the display 230 using a motor. However, this is merely an example and the rotator 235 may rotate the display 230 using other configurations (for example, a chain, etc.).

The audio outputter 240 is configured to output various audio data, various notice sounds, or voice messages which are processed by the audio processor 260. In particular, the audio outputter 240 may be implemented by using a speaker. However, this is merely an example and the audio outputter 240 may be implemented by using other audio outputters such as an audio output terminal.

In particular, when the display 230 is in the horizontal direction, the audio outputter 240 may output a sound corresponding to an image that is displayed on a display screen. In addition, when the display 230 is in the vertical direction, the audio outputter 240 may output a sound of a content which is displayed on one of a plurality of screens, and transmit a sound of a content which is played back on another screen among the plurality of screens to an external apparatus (for example, a mobile phone, a tablet PC, etc.) through a wired network or a wireless network. At this point, the audio outputter 240 may select a screen to be outputted through a speaker and a screen to be outputted through an external apparatus according to a user setting.

The storage 250 may store various modules to drive the display apparatus 200. In particular, a configuration of the storage 250 will be explained below with reference to FIG. 4.

Figure 4:
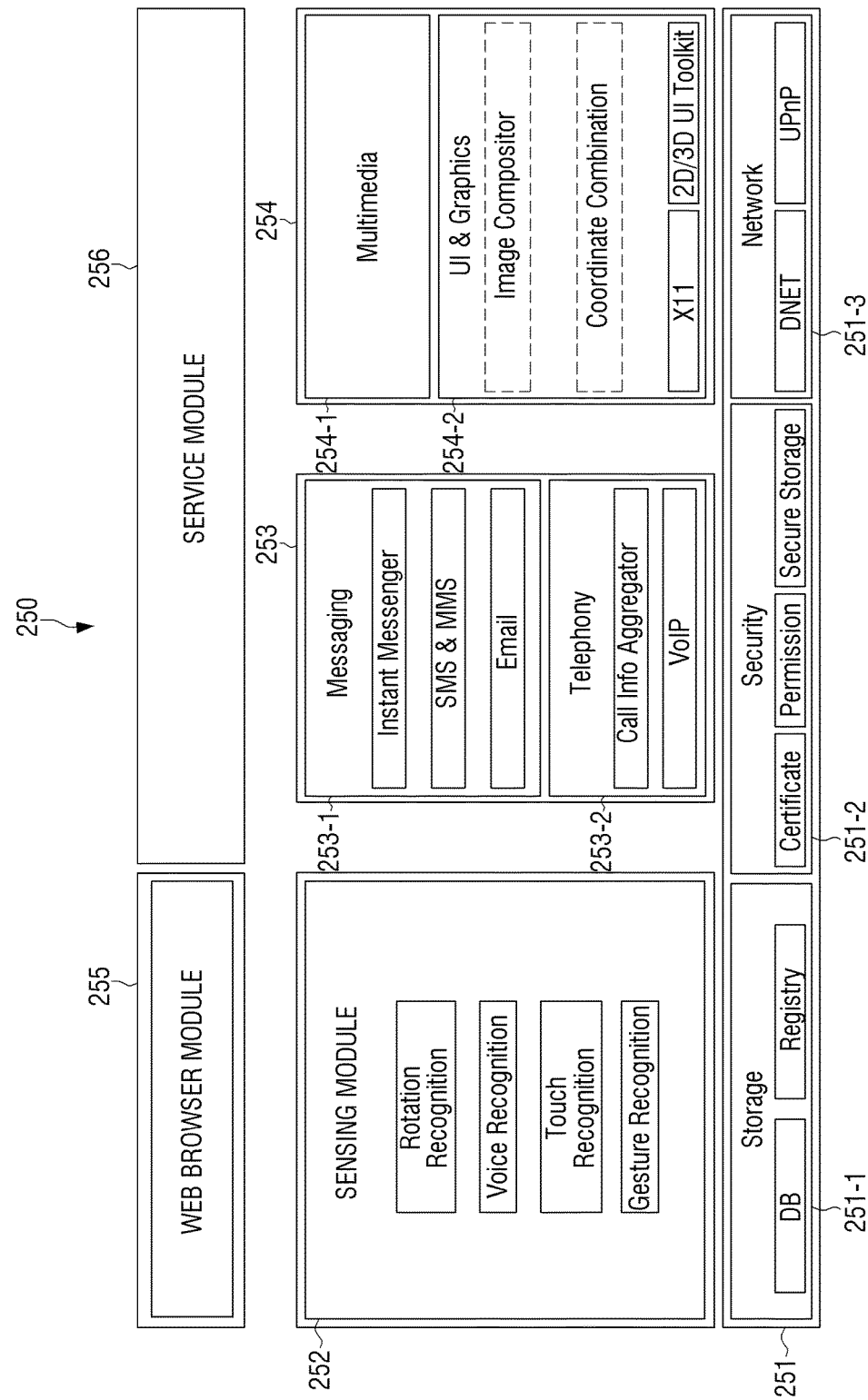
FIG. 4 is a block diagram illustrating a configuration of a storage in detail according to an exemplary embodiment.

FIG. 4 is a view to illustrate a software configuration stored in the storage 250.

Referring to FIG. 4, the storage 250 may store software including a base module 251, a sensing module 252, a communication module 253, a presentation module 254, a web browser module 255, and a service module 256.

The base module 251 is a module that processes signals transmitted from each hardware element that is included in the display apparatus 200, and transmits the signals to an upper layer module. The base module 251 includes a storage module 251-1, a security module 251-2, and a network module 251-3. The storage module 251-1 is a program module that manages a database (DB) or a registry. A main CPU 294 may access the database in the storage 250 using the storage module 251-1, and read out various data. The security module 251-2 is a program module that supports certification for hardware, permission of a request, and a secure storage, and a network module 141-3 is a module for supporting network connection and includes a Distributed-.net (DNET) module and a Universal Plug and Play (UPnP) module.

The sensing module 252 is a module that collects information from various sensors, and analyzes and manages the collected information. The sensing module 252 may include a head direction recognition module (not shown), a face recognition module (not shown), a voice recognition module (not shown), a motion recognition module (not shown), an NFC recognition module (not shown), a rotation recognition module (not shown), and a touch recognition module (not shown).

The communication module 253 is a module to communicate with an external apparatus. The communication module 253 may include a messaging module 253-1 such as a messenger program, a short message service (SMS) and multimedia message service (MMS) program, and an email program, etc., and a telephony module 253-2 which includes a call information aggregator program module and a voice over internet protocol (VoIP) module.

The presentation module 254 is a module for configuring a display screen. The presentation module 254 includes a multimedia module 254-1 to reproduce multimedia content and output the multimedia content, and a user interface (UI) rendering module 254-2 to process a UI and graphics. The multimedia module 254-1 may include a player module, a camcorder module, and a sound processing module. Accordingly, the multimedia module 254-1 generates a screen and a sound by reproducing various multimedia contents, and reproduces the same. The UI rendering 254-2 may include an image compositor module to combine images, a coordinate combination module to combine coordinates on a screen to display an image and generate coordinates, an X11 module to receive various events from hardware, and a 2D/3D UI toolkit to provide a tool for configuring a UI of a 2D or 3D format.

The web browser module 255 is a module that performs web-browsing and accesses a web server. The web browser module 255 may include a web view module (not shown) to render and view a web page, a download agent module (not shown) to download, a bookmark module (not shown), and a web-kit module (not shown), etc.

The service module 256 is a module that includes various applications for providing various services. Specifically, the service module 256 may include various program modules such as an SNS program, a content playback program, a game program, an e-book program, a calendar program, a notice management program, and other widgets.

Although various program modules are illustrated in FIG. 4, some of the various program modules may be omitted, changed, or added according to a kind of the display apparatus 200 and a characteristic of the display apparatus 200. For example, the storage 250 may further include a location-based module that is interlocked with hardware such as a GPS chip and supports a location-based service.

Referring back to FIG. 3, the audio processor 260 is an element that processes audio data. The audio processor 260 may perform various processing operations such as decoding, amplification, and noise filtering with respect to the audio data. The audio processor 260 may include a plurality of audio processing modules to process audio data corresponding to a plurality of contents.

The video processor 270 is an element that processes image data which is received from the image receiver 210. The video processor 270 may perform various image processing operations such as decoding, scaling, noise filtering, frame rate conversion, and resolution conversion with respect to the image data. The video processor 270 may include a plurality of video processing modules to process video data corresponding to a plurality of contents.

In particular, when the display 230 is rotated, the video processor 270 may process a displayed image such that the image is reduced while horizontality of the image is maintained.

The user interface 280 is an element that senses a user interaction to control an overall operation of the display apparatus 200. In particular, as shown in FIG. 3, the user interface 280 may include various interaction sensing apparatuses such as a camera 281, a microphone 282, a remote control signal receiver 283, etc.

The camera 281 is configured to photograph a still image or a moving image. In particular, the camera 281 may photograph various user motions to control the display apparatus 200. The controller 290 may use a user motion which is input through the camera 281. The microphone 282 is configured to receive a user voice or other sounds and convert it into audio data. The controller 290 may use a user voice which is input through the microphone 282 in a call process, or may convert the user voice into audio data and store the audio data in the storage 250. When the camera 281 and the microphone 282 are provided, the controller 290 may perform a control operation according to a user voice which is input through the microphone 282 or a user motion which is input through the camera 281. That is, the display apparatus 200 may operate in a motion control mode or a voice control mode. In the motion control mode, the controller 290 activates the camera 221 and photographs the user, and traces a change in the motion of the user and performs a corresponding control operation. In the voice control mode, the controller 290 may operate in a voice recognition mode in which a user voice input through the microphone is analyzed and a control operation is performed according to the analyzed user voice. Also, the remote control signal receiver 283 may receive a remote control signal including a control command from a remote controller, which is an external remote control apparatus 50.

Also, the user interface 280 may receive a user interaction to rotate the display 230. This will be explained in detail below with reference to the drawings.

The controller 290 controls an overall operation of the display apparatus 200 using various programs stored in the storage 250.

As shown in FIG. 3, the controller 290 includes a random access memory (RAM) 291, a read only memory (ROM) 292, a graphic processor 293, a main CPU 294, first to nth interfaces 295-1 to 295-n, and a bus 296. The first to nth interfaces 295-1 to 295-n are connected to one another through the bus 296.

The ROM 292 stores a set of commands to boot the system. When a turn on command is input and power is supplied, the CPU 294 copies an O/S stored in the storage 250 to the RAM 291 according to a command stored in the ROM 292, executes the O/S, and boots the system. When the booting is completed, the main CPU 294 copies various application programs stored in the storage 250 to the RAM 291, executes the application programs copied to the RAM 291, and performs various operations.

The graphic processor 293 generates a screen including various objects such as an icon, an image, and a text using a calculator (not shown) and a renderer (not shown). The calculator calculates attribute values of each object to be displayed, such as coordinates values, a shape, a size, and a color, according to a layout of the screen using a control command received through the user interface 280. The renderer generates a screen of various layouts including objects based on the attribute values calculated by the calculator. The screen generated by the renderer is displayed on a display area of the display 230.

The main CPU 294 accesses the storage 250 and performs booting using the O/S stored in the storage 250. The main CPU 294 performs various operations using various programs, content, and data stored in the storage 250.

The first to nth interfaces 295-1 to 295-n are connected to the above-described various elements. One of the interfaces may be a network interface that is connected to an external apparatus through a network.

In particular, when a predetermined event occurs while the display 230 is placed in the horizontal direction, the controller 290 controls the rotator 235 to rotate the display 230 and place the display 230 in the vertical direction according to the predetermined event.

The predetermined event may be an event in which the user directly inputs a user interaction, or may be an event in which the controller 290 senses a predetermined condition without receiving user input.

Hereinafter, the predetermined event to rotate the display 230 will be explained in detail with reference to the accompanying drawings.

Figure 5:
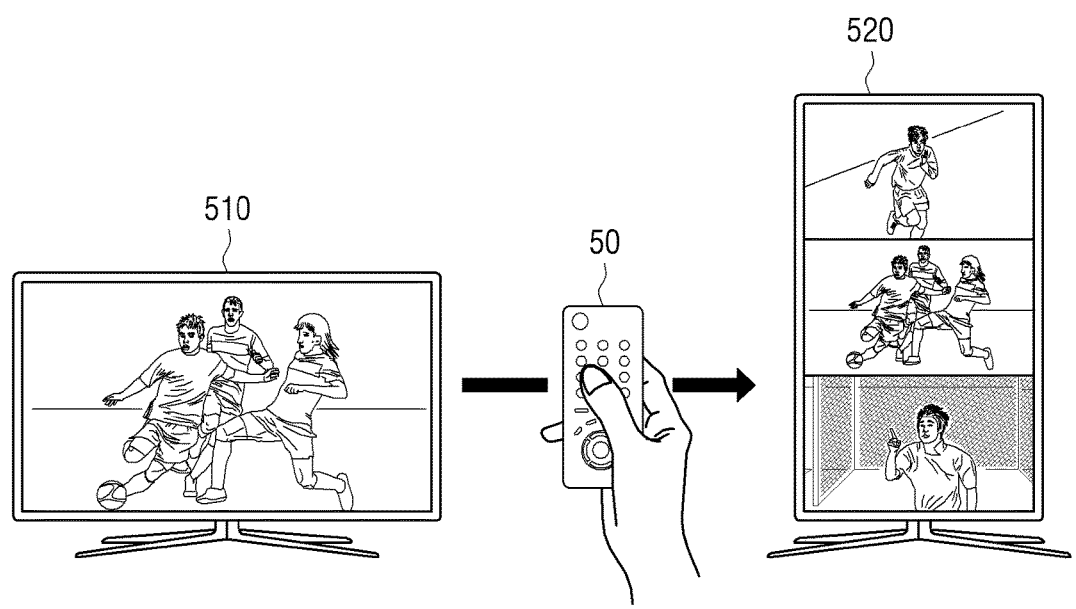
FIGS. 5 to 11 are views illustrating a predetermined event in which a display is rotated according to various exemplary embodiments.
Figure 6:
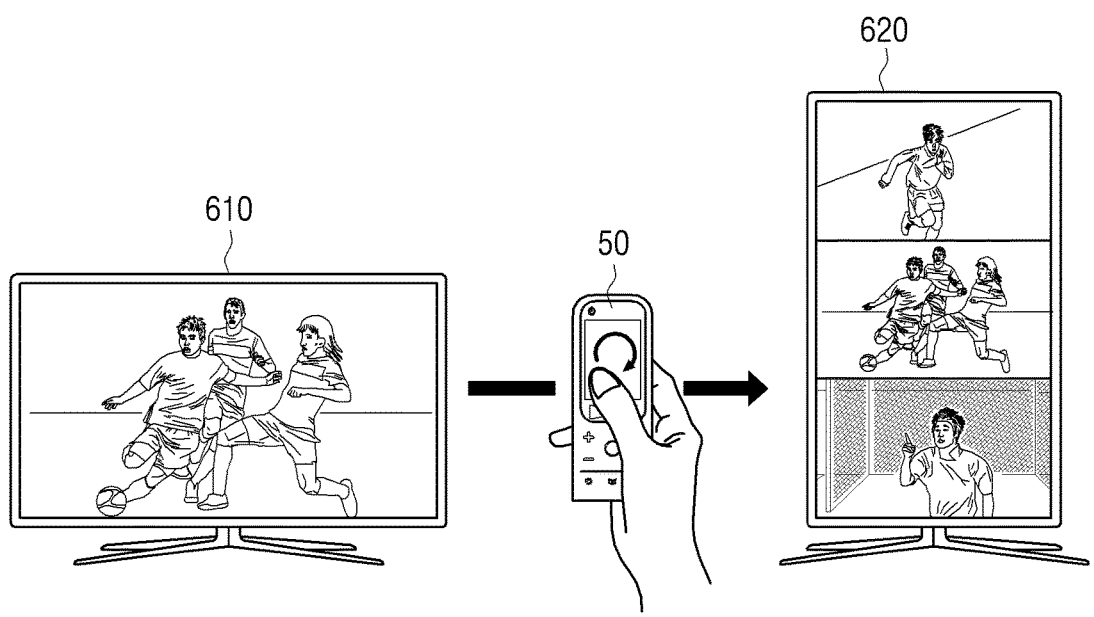
Figure 7:
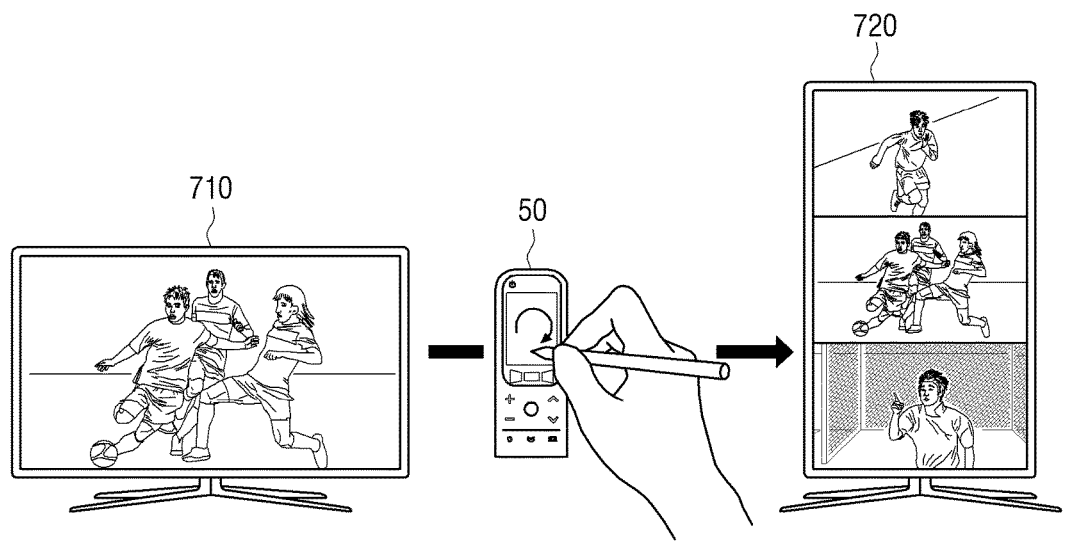

First, when an event in which a predetermined user interaction is sensed in a predetermined area of the remote control apparatus 50 occurs, the controller 290 may rotate the display 230 to place the display 230 in the horizontal direction in the vertical direction. Specifically, when a display 510 in the horizontal direction displays an image as shown in the left view of FIG. 5, and a user interaction in which a rotation button of a remote controller is selected is sensed in the meantime, the controller 290 may rotate the display 230 to change the display 510 in the horizontal direction to a display 520 in the vertical direction as shown in the right view of FIG. 5. Also, the remote control apparatus 50 may be equipped with a touch screen. In this case, when a display 610 in the horizontal direction displays an image as shown in the left view of FIG. 6, and a user touch interaction in which the user draws a circle on the touch screen of the remote control apparatus 50 in a clockwise direction is sensed in the meantime, the controller 290 may rotate the display 230 to change the display 610 in the horizontal direction to a display 620 in the vertical direction as shown in the right view of FIG. 6. Alternatively, the controller 290 may rotate the display 230 in the clockwise direction according to the direction of the user touch interaction which is input to the touch screen of the remote control apparatus 50. Also, the touch screen of the remote control apparatus 50 may be manipulated by a touch pen. In this case, when a display 710 in the horizontal direction displays an image as shown in the left view of FIG. 7, and a touch pen interaction in which the user draws a circle on the touch screen of the remote control apparatus 50 using the touch pen in the clockwise direction is sensed in the meantime, the controller 290 may rotate the display 230 to change the display 710 in the horizontal direction to a display 720 in the vertical direction as shown in the right view of FIG. 7. Alternatively, the controller 290 may rotate the display 230 in the clockwise direction according to the direction of the user touch interaction which is input to the touch screen of the remote control apparatus 50.

Figure 8:
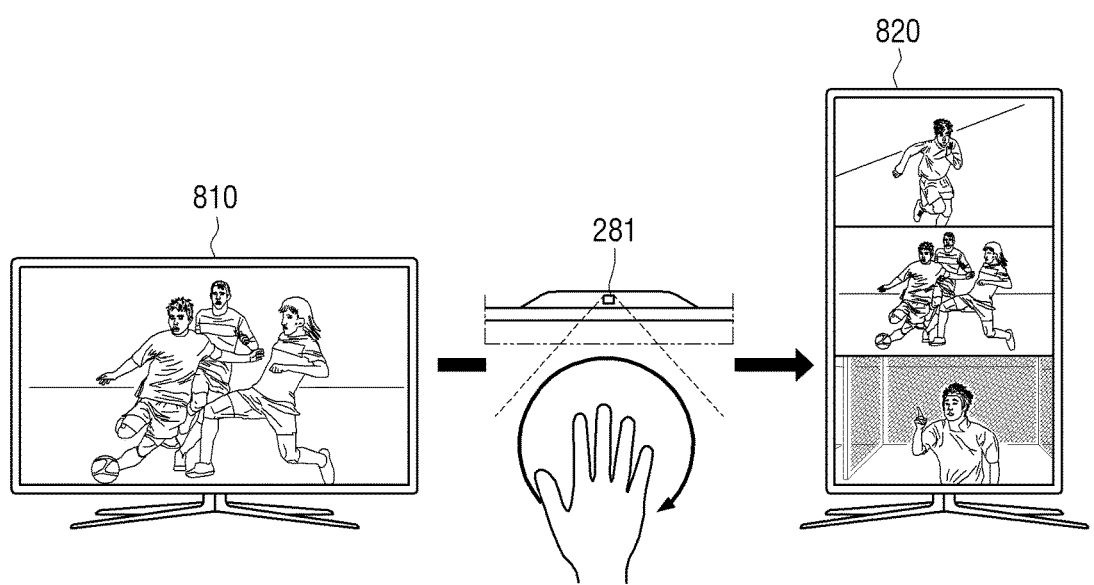

Also, when an event in which a predetermined user motion is photographed by the camera 281 occurs, the controller 290 may rotate the display 230 to place the display 230 in the horizontal direction in the vertical direction. Specifically, when a display 810 in the horizontal direction displays an image as shown in the left view of FIG. 8, and a user interaction in which the user rotates his/her hand in the clockwise direction is sensed by the camera 281 in the meantime, the controller 290 may rotate the display 230 to change the display 810 in the horizontal direction to a display 820 in the vertical direction as shown in the right view of FIG. 8. At this time, the controller 290 may rotate the display 230 in the clockwise direction according to the direction of the user rotation interaction which is photographed by the camera 281. Alternatively, the controller 290 may rotate the display 230 in the counterclockwise direction according to the direction of the user rotation interaction which is photographed by the camera 281.

Also, when an event in which a predetermined user voice is input through the microphone 282 occurs, the controller 290 may rotate the display 230 to place the display 230 in the horizontal direction in the vertical direction. Specifically, when the display in the horizontal direction displays an image and a user voice 'Please rotate' is input to the microphone 282, the controller 290 may rotate the display 230 to change the display 230 in the horizontal direction to the display 230 in the vertical direction. Also, when the display 230 is rotated by the user voice, at least one of a rotation angle and a speed of the display 230 may be adjusted according to a level of the voice or the voice command.

Figure 9:
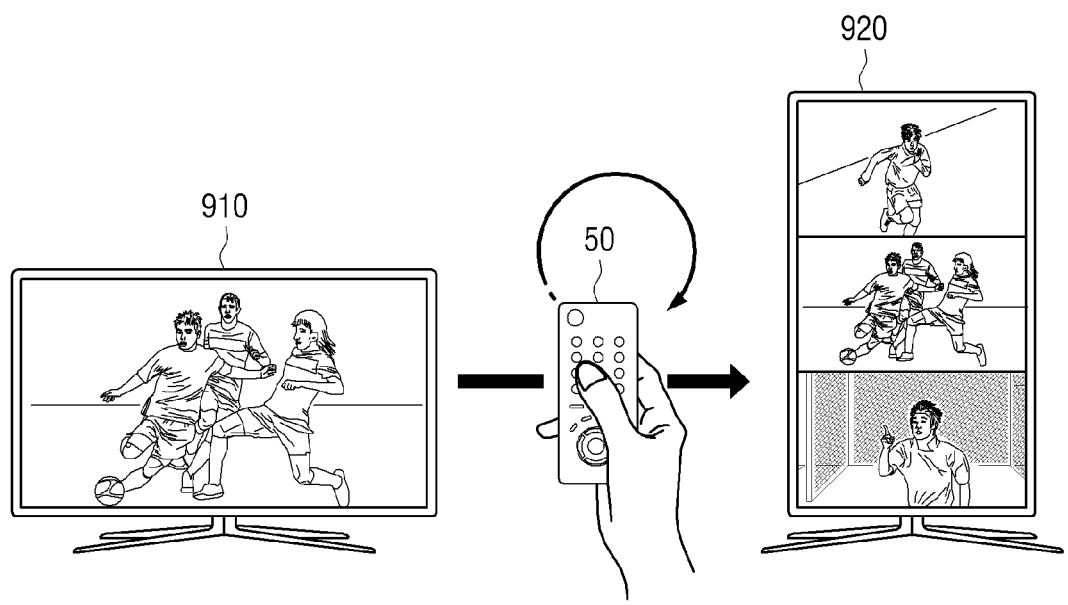

When an event in which a predetermined pointing interaction is input through an external apparatus (for example, the remote control apparatus 50) occurs, the controller 290 may rotate the display 230 to place the display 230 in the horizontal direction in the vertical direction. Specifically, when a display 910 in the horizontal direction displays an image as shown in the left view of FIG. 9, and a user command to press a trigger button of the remote control apparatus 50 and then rotate in the clockwise direction is input in the meantime, the controller 290 may rotate the display 230 to change the display 910 in the horizontal direction to a display 920 in the vertical direction as shown in the right view of FIG. 9. At this time, the controller 290 may rotate the display 230 in the clockwise direction according to the direction of the rotation interaction of the remote control apparatus 50. Alternatively, the controller 290 may rotate the display 230 in the counterclockwise direction according to the direction of the rotation interaction of the remote control apparatus 50.

Figure 10:
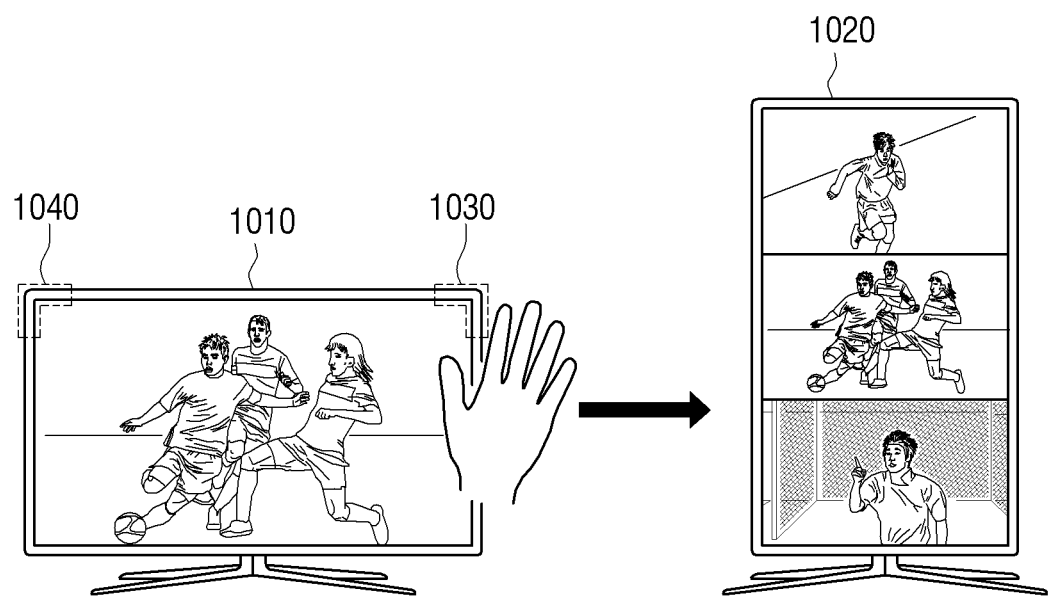
Figure 11:
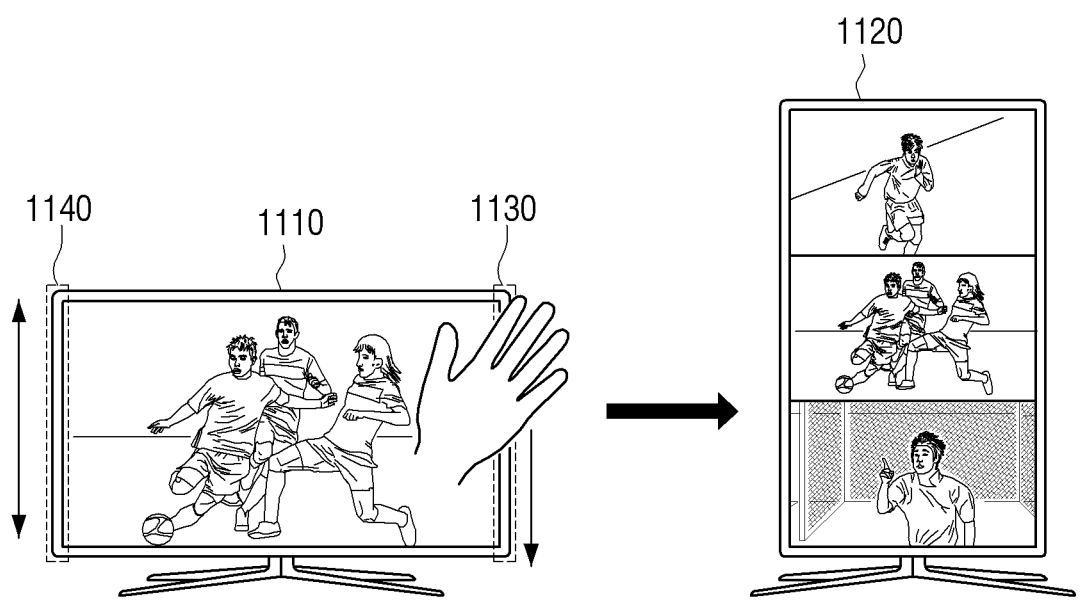

When an event in which a predetermined user touch is input to the touch sensor provided in the bezel of the display 230 occurs, the controller 290 may rotate the display 230 to place the display 230 in the horizontal direction in the vertical direction. Specifically, when a display 1010 in the horizontal direction displays an image as shown in the left view of FIG. 10 and a user touch is sensed in one of the corners 1030 and 1040 of the bezel of the display 230 in the meantime, the controller 290 may rotate the display 230 to change the display 1010 in the horizontal direction to a display 1020 in the vertical direction as shown in the right view of FIG. 10. Also, when a display 1110 in the horizontal direction displays an image as shown in the left view of FIG. 11, and a user touch in the vertical direction is sensed in one side surface 1130 or 1140 of the bezel of the display 230 in the meantime, the controller 290 may rotate the display 230 to change the display 1110 in the horizontal direction to a display 1120 in the vertical direction as shown in the right view of FIG. 11. At this time, the controller 290 may determine a rotation direction of the display 230 according to the direction of the user touch. For example, when the user touches the right side surface 1130 of the bezel downwardly, the controller 290 may rotate the display 230 in the clockwise direction according to the direction of the user touch. Alternatively, when the user touches the left side surface 1140 of the bezel downwardly, the controller 290 may rotate the display 230 in the counterclockwise direction according to the direction of the user touch.

As described above, the display 230 may be rotated according to the user interaction. However, this is merely an example and the display 230 may be rotated by other user interactions. For example, the display 230 may be rotated by various interactions such as a user's eye blinking interaction and head rotation interaction.

Also, the rotation interaction described above may include a rotation interaction that makes one or more turns as well as a rotation interaction that makes partial turn, such as a half turn.

Also, when an event in which the display apparatus 100 senses a predetermined condition without receiving user input occurs, the controller 290 may rotate the display 230 in the horizontal direction to be in the vertical direction.

Specifically, when the display apparatus 200 performs a mirroring function to receive an image from the mobile apparatus 300 and display the same image as that of the mobile apparatus 300, and when an event in which a content of a specific condition is displayed on the mobile apparatus 300 occurs, the controller 290 may rotate the display 230 in the horizontal direction to be in the vertical direction and display the content of the specific condition on the display 230 in the vertical direction. At this time, the content of the specific condition may be an image content that is appropriate for the display 230 in the vertical direction rather than the display 230 in the horizontal direction, and may be an image that is photographed in the vertical direction.

Also, when an event in which a specific game is performed occurs, the controller 290 may rotate the display 230 in the horizontal direction to be in the vertical direction and may display the game content on the display 230 in the vertical direction. At this time, the specific game may be a game content that is appropriate for the display 230 in the vertical direction, and may include a Tetris game content.

Also, when an event in which a user motion is sensed in a specific mode (for example, a sleep mode) occurs, the controller 290 may rotate the display 230 according to the user motion. Specifically, when the display apparatus 200 enters a sleep mode, the camera 281 may photograph the user motion and the controller 290 may rotate the display 230 according to a posture of the photographed user. For example, when the user stands up, the controller 290 may rotate the display 230 to be placed in the vertical direction, and, when the user lies down, the controller 290 may rotate the display 230 to be placed in the horizontal direction.

Also, when an event in which communication with an external apparatus is established occurs, the controller 290 may rotate the display 230 in the horizontal direction to be in the vertical direction. Specifically, when an event in which communication with an external apparatus that is appropriate for displaying the display 230 in the vertical direction (for example, a refrigerator, an air conditioner, etc.) is established occurs, the controller 290 may rotate the display 230 in the horizontal direction to be the display 230 in the vertical direction, and may display an image corresponding to the external apparatus connected with the display 230 in the vertical direction (for example, an inside image of the refrigerator).

As described above, when an event in which a predetermined condition is satisfied without receiving user input occurs, the display apparatus 200 automatically rotate the display 230 such that the user can view an image that is appropriate to view through the display 230 in the vertical direction more easily without separately inputting.

Also, the controller 290 may change the image in various methods while the display 230 in the horizontal direction is rotated to be the display of 230 the vertical direction, and may display the image on the display 230 in the vertical direction.

In particular, when an event to rotate the display occurs while a first image is displayed on the display 230 in the horizontal direction, the controller 290 may control the video processor 270 to reduce a size of the first image with horizontality of the first image being maintained while the display 230 is rotated. Also, the controller 290 may control the video processor 270 and the display 230 to display a new image on another area of the display 230 while the size of the first image is reduced.

Figure 12:
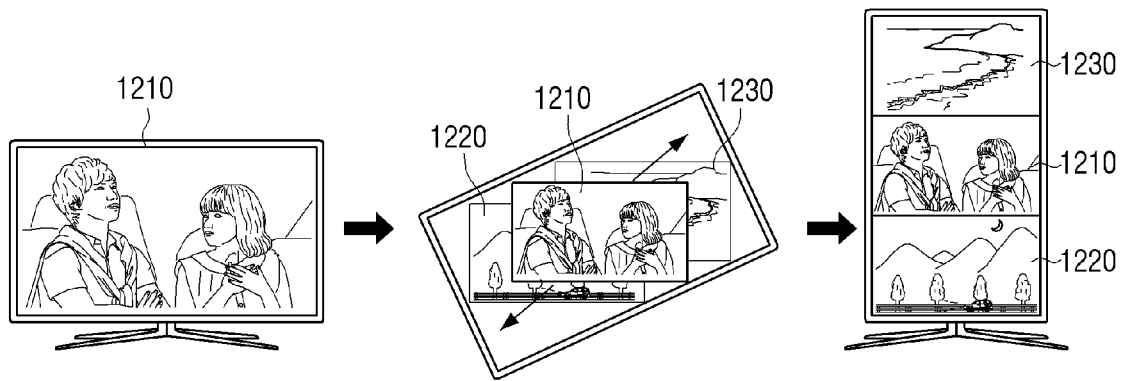
FIGS. 12 to 15 are views illustrating a process in which an image is changed while a display is rotated according to various exemplary embodiments.

Specifically, when an event to rotate the display 230 occurs while the display 230 in the horizontal direction displays a first image 1210 as shown in the left view of FIG. 12, the controller 290 may control the video processor 270 and the display 230 to gradually reduce a size of the first image 1210 with horizontality of the first image 1210 being maintained and make a second image 1220 and a third image 1230 appear behind the first image 1210, while the display 230 is rotated in a counter clockwise direction, as shown in the middle view of FIG. 12. When the rotation is completed, the controller 290 may control the display 230 to display the three images 1210, 1220, and 1230 of the same size as shown in the right view of FIG. 12.

Figure 13:
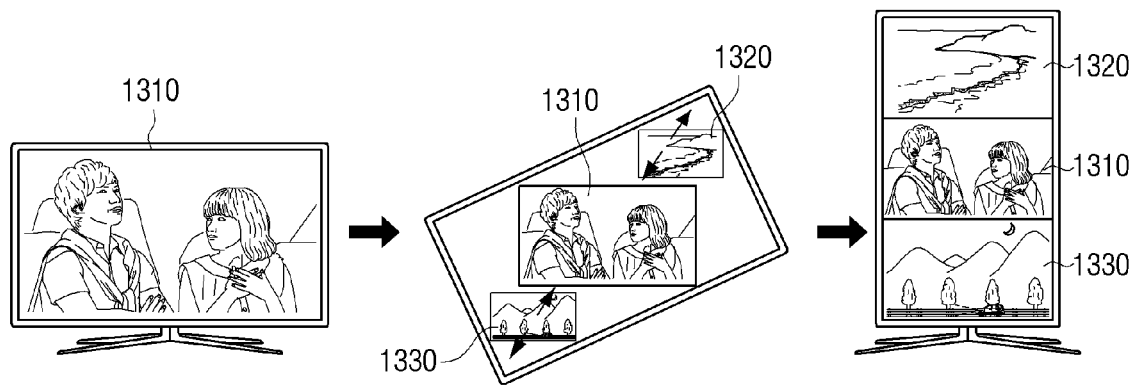

Also, when an event to rotate the display 230 occurs while the display 230 in the horizontal direction displays a first image 1310 as shown in the left view of FIG. 13, the controller 290 may control the video processor 270 and the display 230 to gradually reduce a size of the first image 1310 with horizontality of the first image 1310 being maintained, and gradually increase a second image 1320 and a third image 1330 on areas separate from the area where the first image 1310 is displayed, while the display 230 is rotated in the counter clockwise direction, as shown in the middle view of FIG. 13. When the rotation is completed, the controller 290 may control the display 230 to display the three images 1310, 1320, and 1330 of the same size as shown in the right view of FIG. 13.

Figure 14:
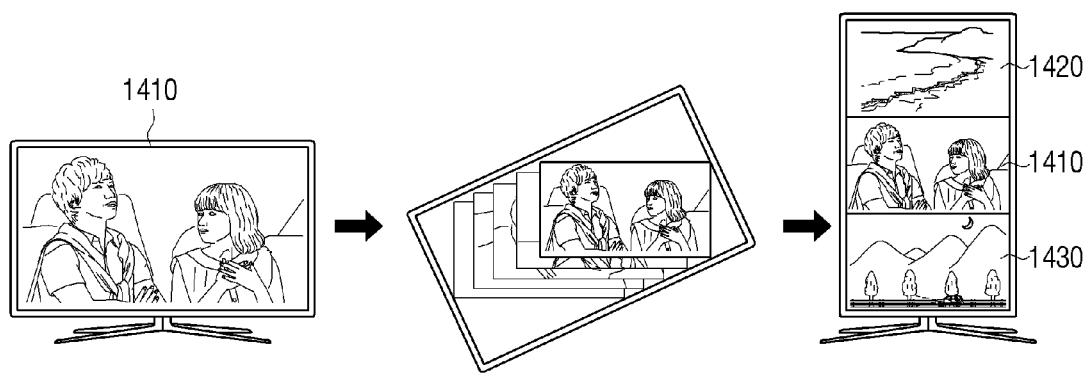

Also, when an event to rotate the display 230 occurs while the display 230 in the horizontal direction displays a first image 1410 as shown in the left view of FIG. 14, the controller 290 may control the video processor 270 and the display 230 to display a plurality of frames related to the first image 1410, while the display 230 is rotated in the counter clockwise direction, as shown in the middle view of FIG. 14. When the rotation is completed, the controller 290 may control the display 230 to display the three images 1410, 1420, and 1430 of the same size as shown in the right view of FIG. 14.

Figure 15:
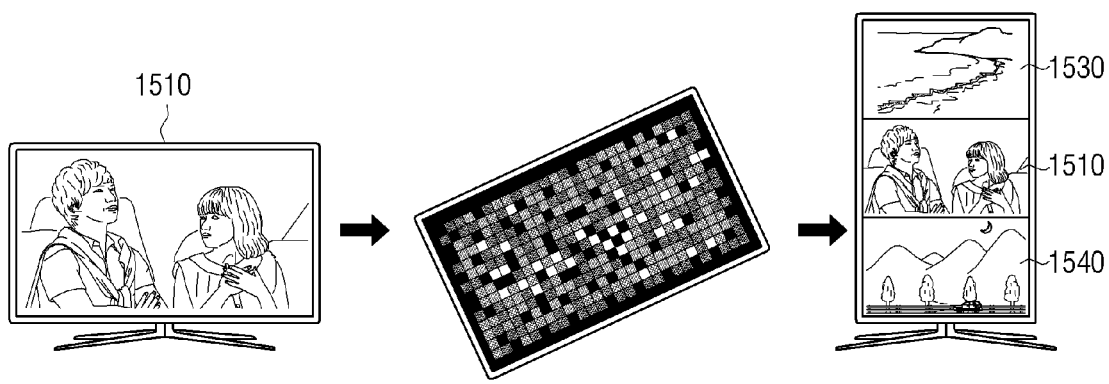

Also, when an event to rotate the display 230 occurs while the display 230 in the horizontal direction displays a first image 1510 as shown in the left view of FIG. 15, the controller 290 may control the video processor 270 and the display 230 to display an image in which pixels of the first image 1510 are divided and scattered, while the display 230 is rotated in the counter clockwise direction, as shown in the middle view of FIG. 15. When the rotation is completed, the controller 290 may re-combine the pixels which have been divided and scattered, generate three images 1510, 1520, and 1530, and display the images as shown in the right view of FIG. 15.

As described above, the display apparatus 200 may display various graphic effects while the display 230 is rotated, so that the user can enjoy entertainment while the display 230 is rotated.

On the other hand, although the three images are generated after the rotation is completed in the exemplary embodiments of FIGS. 12 to 15, this is merely an example. At least one image may be displayed. Also, although the plurality of images generated after the rotation is completed have the same size in the exemplary embodiments of FIGS. 12 to 15, this is merely an example and the plurality of images may have different sizes. Although in clockwise or counterclockwise rotation may be shown, it will be understood that the rotation direction may be changed to counterclockwise or clockwise, respectively.

Also, as explained in FIGS. 12 to 15, a graphic effect related to the previously displayed image is provided while the display 230 is rotated. However, this is merely an example. A graphic effect having nothing to do with the previously displayed image may be provided. For example, the controller 290 may display a phrase indicating rotation while the display 230 is rotated, or may display a UI indicating the rotation direction. Also, the controller 290 may display the UI guiding rotation using not only a display panel of the display 230 but also an LED window provided on the bezel.

When an event to rotate the display 230 occurs while the display 230 in the horizontal direction displays a first image, the controller 290 may control the rotator 235 to rotate the display 230 in the horizontal direction to be in the vertical direction, and may control the display 230 to generate a plurality of screens on the rotated display 230, display the first image on one of the plurality of screens, and display at least one second image related to the first image on another screen among the plurality of screens according to attributes of the first image.

Figure 16:
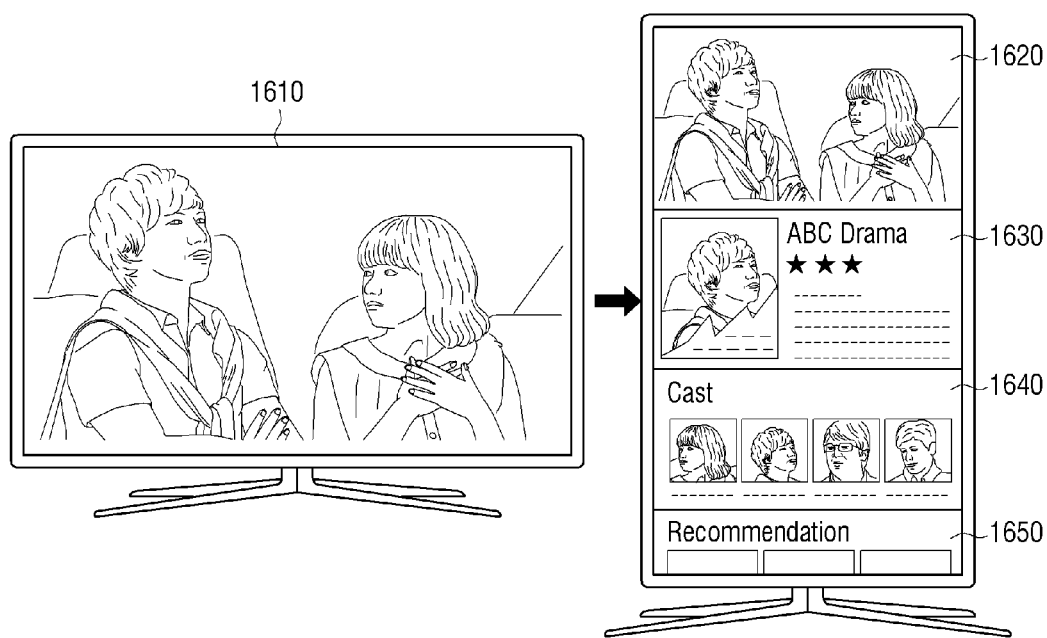
FIGS. 16 to 33 are views illustrating various images which are displayed on a display of a vertical direction according to various exemplary embodiments.

Specifically, when the display 230 in the horizontal direction displays the first image, the controller 290 may display an image and information related to the image on a plurality of screens of the display 230 in the vertical direction. According to an exemplary embodiment, when an event to rotate the display occurs while the display 230 in the horizontal direction displays a first image 1610 as shown in the left view of FIG. 16, the controller 290 may control the rotator 235 to rotate the display 230 in the horizontal direction to be in the vertical direction. Also, the controller 130 may control the display 230 to generate a plurality of screens on the display 230 in the vertical direction, display a reduced first image 1620 on a first screen among the plurality of screens, and display detailed information 1630 of the first image, cast information 1640 of the first image, and recommendation image information 1650 related to the first image on the other screens among the plurality of screens. At this time, the information 1630, 1640, and 1650 related to the first image may be retrieved from an external server based on metadata included in the first image.

Figure 17:
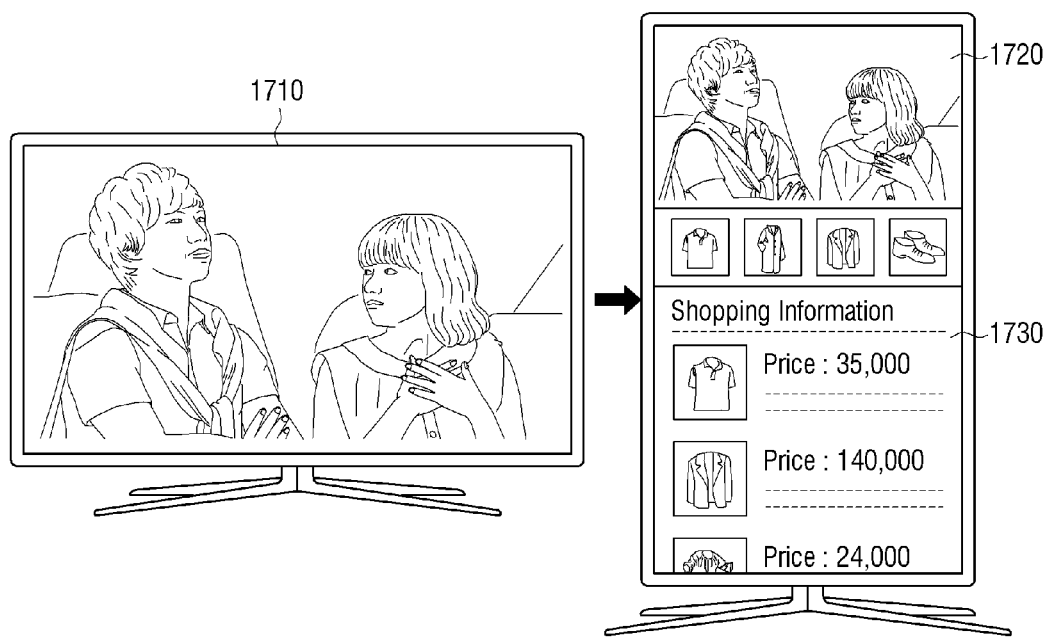

According to another exemplary embodiment, when an event to rotate the display occurs while the display 230 in the horizontal direction displays a first image 1710 as shown in the left view of FIG. 17, the controller 290 may control the rotator 235 to rotate the display 230 in the horizontal direction to be in the vertical direction, and may control the display 230 to generate a plurality of screens on the display 230 in the vertical direction, display a reduced first image 1720 on an upper screen among the plurality of screens, and display shopping information 1730 of one or more products included in the reduced first image 1720 on a lower screen, as shown in the right view of FIG. 17. As a non-limiting example, the shopping information 1730 may be retrieved from an external server based on metadata included in the first image.

Also, the controller 290 may display images of the same content from various camera angles on the display 230 in the vertical direction simultaneously. According to an exemplary embodiment, when an event to rotate the display occurs while the display 230 in the horizontal direction displays an image that is photographed of sports game from a first camera as shown in the left view of FIG. 18A, the controller 290 may control the rotator 235 to rotate the display 230 in the horizontal direction to be in the vertical direction. Also, the controller 290 may control the display 230 to generate a plurality of screens on the display 230 in the vertical direction, display an image 1820 of the sports game from the first camera on a middle screen among the plurality of screens, display an image 1830 of the sports game from a second camera on an upper screen among the plurality of screens, and display an image 1840 of the sports game from a third camera on a lower screen among the plurality of screens. As described above, images that are photographed for the same sports game by using various cameras are displayed altogether, so that a sense of realism can be increased and also the user can view all of the scenes of the sports game without missing them. Although three images from three cameras are described in relative screen locations, exemplary embodiments are not limited to such. For example, four images from four cameras may be shown, and the first image may be in an upper screen.

Figure 18A:
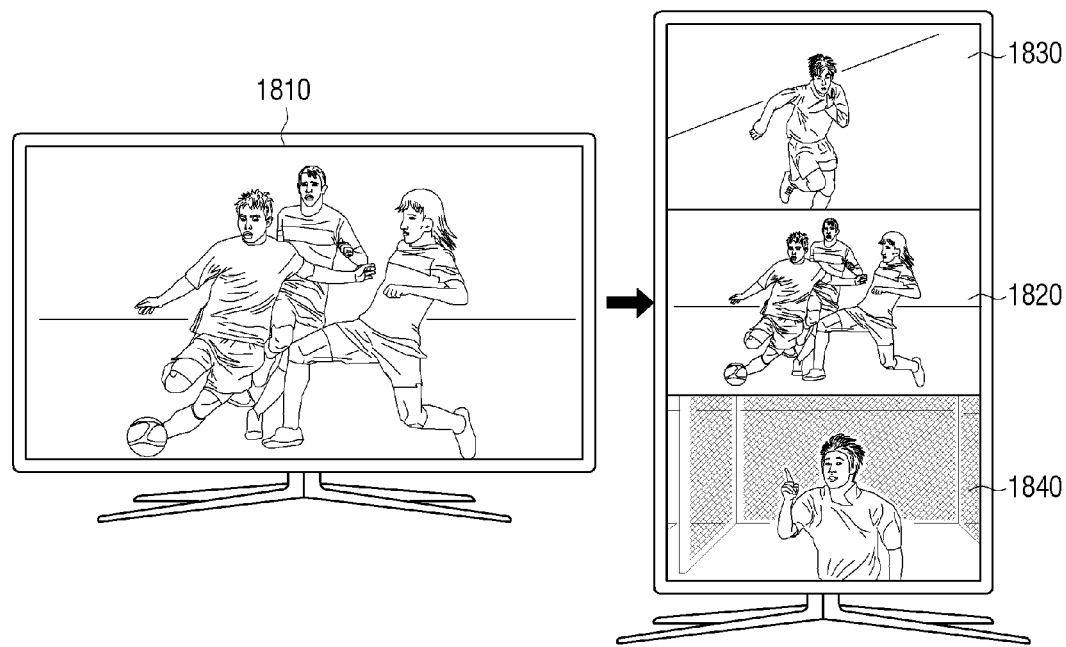
Figure 18B:
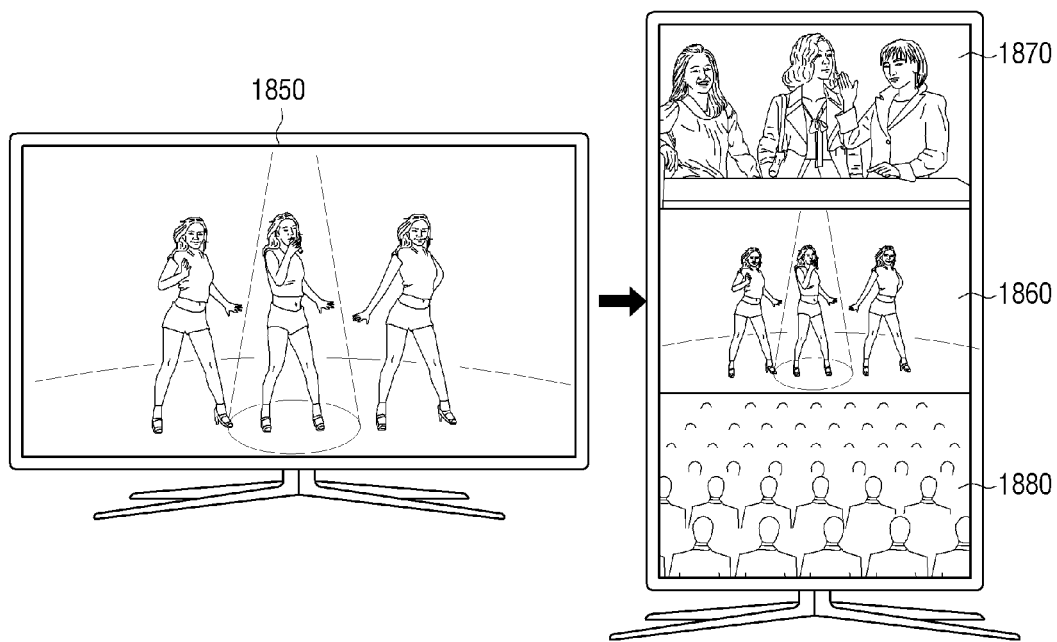

According to still another exemplary embodiment, when an event to rotate the display occurs while the display 230 in the horizontal direction displays an image 1850 of an audition program from a first camera as shown in the left view of FIG. 18B, the controller 290 may control the rotator 235 to rotate the display 230 in the horizontal direction to be in the vertical direction. The controller 290 may control the display 230 to generate a plurality of screens on the display 230 in the vertical direction, display an audition image 1860 of the audition program from the first camera on a middle screen among the plurality of screens, display a judge image 1870 of the audition program from a second camera on an upper screen among the plurality of screens, and display an audience image 1880 of the audition program from a third camera on a lower screen among the plurality of screens. As described above, images that are photographed for the same audition program by using various cameras are displayed altogether, so that the user can see reaction of the judges and an audience as well as audition singers, and thus a sense of realism can be further increased. Although three images from three cameras are described in relative screen locations, exemplary embodiments are not limited to such. For example, four images from four cameras may be shown, and the first image may be in an upper screen or a lower screen.

The images from plurality of cameras as described in FIGS. 18A and 18B may be received by a content provider.

Figure 19:
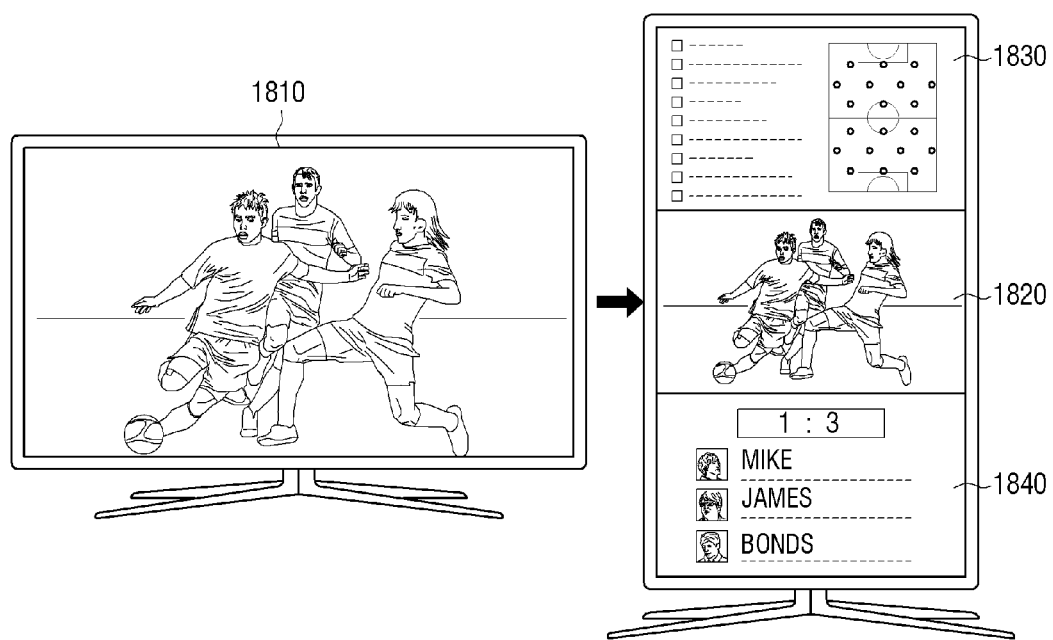

When the image displayed on the display 230 in the horizontal direction is a sports image, the controller 290 may display the sports image and an image for providing a service related to the sports image on the display 230 in the vertical direction altogether. Specifically, when an event to rotate the display occurs while the display 230 in the horizontal direction displays a sports image 1910 as shown in FIG. 19, the controller 290 may control the rotator 235 to rotate the display 230 in the horizontal direction to be in the vertical direction. Also, the controller 290 may control the display 230 to generate a plurality of screens on the display 230 in the vertical direction, display a reduced sports image 1920 on a middle screen among the plurality of screens, display a real-time analysis information image 1930 on the sports image on an upper screen among the plurality of screens, and display social network service (SNS) information 1940 on the currently displayed sports image on a third screen among the plurality of screens. Accordingly, the user can be provided with the services related to the sports game as well as the sports game image.

Figure 20:
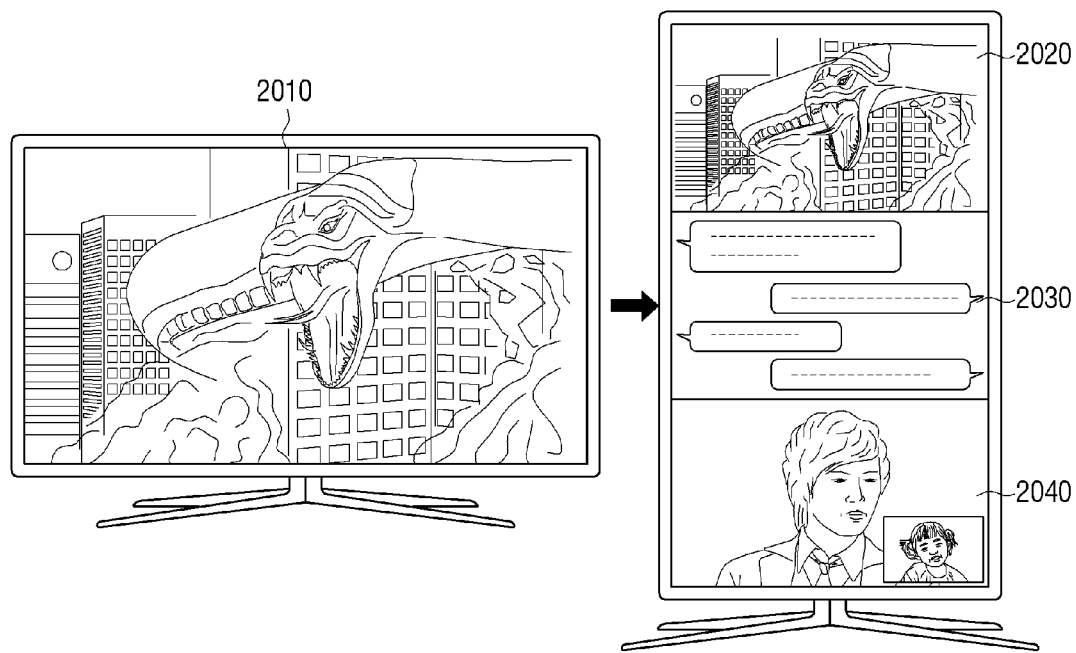

Also, when the display apparatus 200 provides an external chatting function or a video call function, the controller 290 may display an image, a chatting window, and a video call image on the display 230 in the vertical direction. Specifically, when an event to rotate the display occurs while the display 230 in the horizontal direction displays a first image 2010 as shown in FIG. 20, the controller 290 may control the rotator 235 to rotate the display 230 in the horizontal direction to be in the vertical direction. Also, the controller 290 may control the display 230 to generate a plurality of screens on the display 230 in the vertical direction, display a reduced first image 2020 on an upper screen among the plurality of screens, display a chatting image 2030 on a middle screen among the plurality of screens, and display a video call screen 2040 on a lower screen among the plurality of screens, as shown in the right view of FIG. 20. At this time, although the chatting image 2030 and the video call image 2040 are simultaneously displayed in FIG. 20. However, only one of the two images may be displayed. Accordingly, the user can perform chatting or video call with another user while viewing the image. In particular, in an exemplary embodiment in which the video call image or the chatting image is displayed on another screen among the plurality of screens, the event to rotate the display may be a video call request confirming event or a chatting request confirming event.

Figure 21:
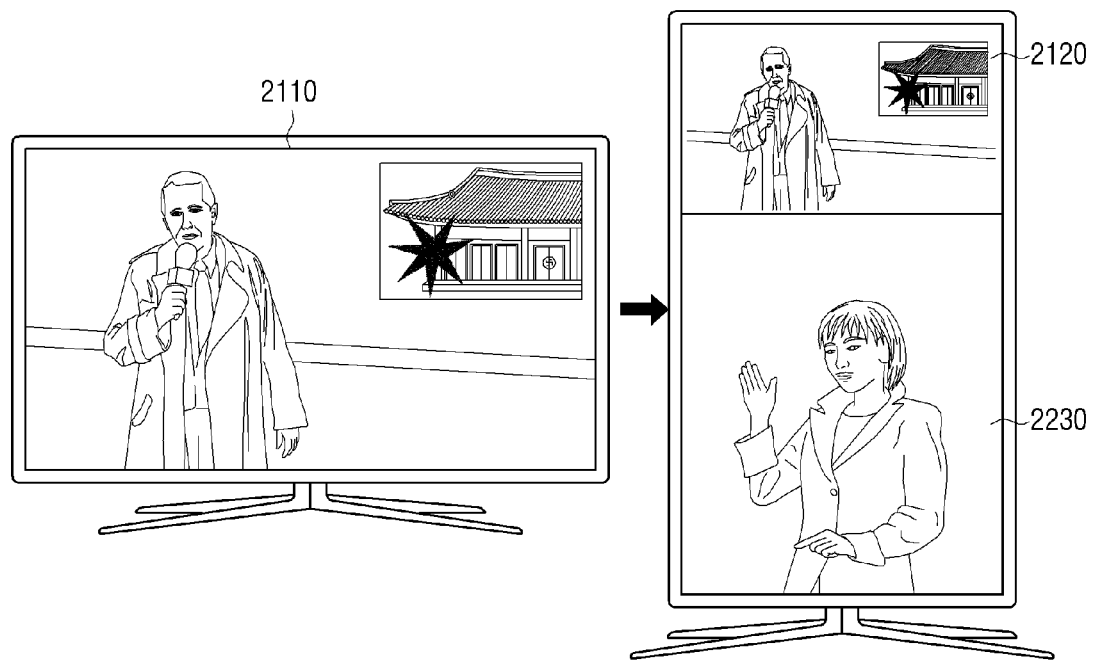

Also, the controller 290 may display a first image and a sign language image corresponding to a sound output from the first image on the display 230 in the vertical direction. Specifically, when an event to rotate the display is sensed while the display 230 in the horizontal direction displays a news image 2110 as shown in the left view of FIG. 21, the controller 290 may control the rotator 235 to rotate the display 230 in the horizontal direction to be in the vertical direction. The controller 290 may control the display 230 to generate a plurality of screens on the display 230 in the vertical direction, display a reduced size news image 2120 on an upper screen among the plurality of screens, and display a sign language image corresponding to the news image on a lower screen among the plurality of screens, as shown in the right view of FIG. 21. Accordingly, a hearing-impaired person can view the image through the larger sign language image. According to an exemplary embodiment, the sign language image may be provided by a content provider (for example, a broadcasting station). Although in FIG. 21 a size news image 2110 is shown, this is an example and exemplary embodiments are not limited to news images.

Figure 22:
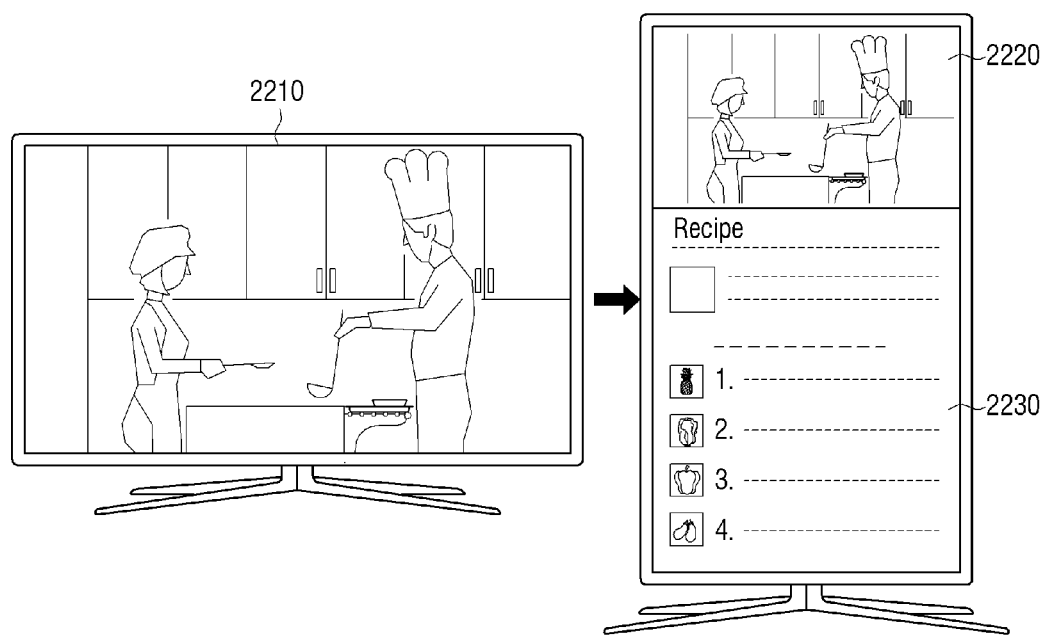

When the image displayed on the display 230 in the horizontal direction is a cooking program image, the controller 290 may display recipe information corresponding to the cooking program on the display 230 in the vertical direction in addition to the cooking program image. Specifically, when an event to rotate the display is sensed while the display 230 in the horizontal direction displays a cooking program image 2210 as shown in the left view of FIG. 22, the controller 290 may control the rotator 235 to rotate the display 230 in the horizontal direction to be in the vertical direction. The controller 290 may control the display 230 to generate a plurality of screens on the display 230 in the vertical direction, display a reduced cooking program image 2220 on an upper screen among the plurality of screens, and display recipe information 2230 corresponding to the food currently provided in the cooking program on a lower screen among the plurality of screens, as shown in a right view of FIG. 22. At this time, the recipe information 2230 may be retrieved from an external server based on metadata included in the cooking program.

Figure 23:
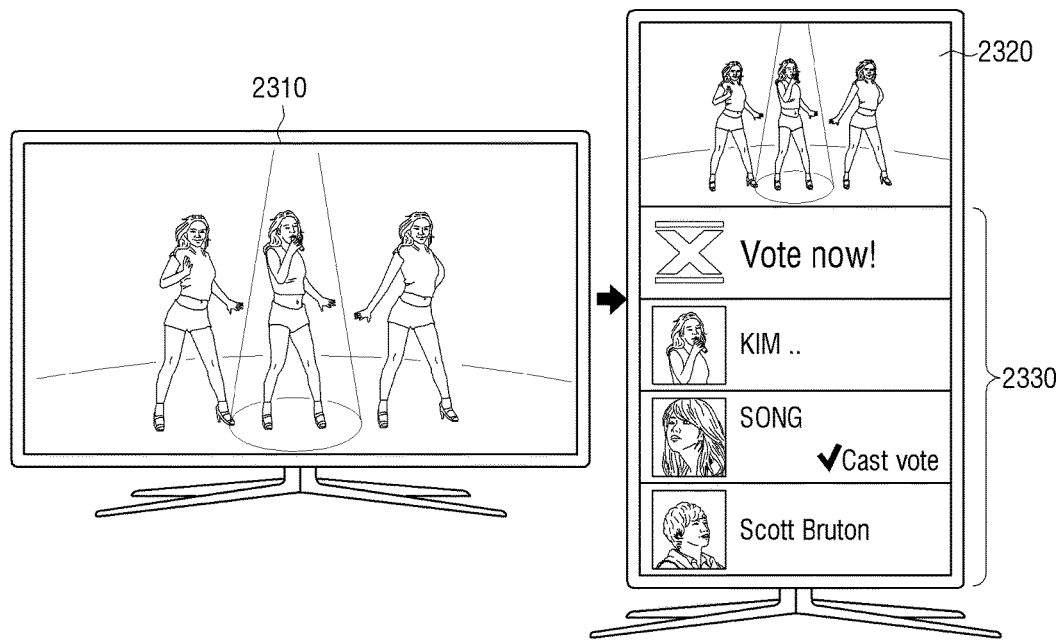

Also, when the image displayed on the display 230 in the horizontal direction is a broadcasting program image in which audience participation is available, the controller 290 may display an image regarding an audience participation image on the display 230 in the vertical direction in addition to the broadcasting program. Specifically, when an event to rotate the display occurs while the display 230 in the horizontal direction displays an audition program image 2310 in which audience participation is available as shown in the left view of FIG. 23, the controller 290 may control the rotator 235 to rotate the display 230 in the horizontal direction to be in the vertical direction. The controller 290 may control the display 230 to generate a plurality of screens on the display 230 in the vertical direction, display a reduced size audition program image 2320 on an upper screen among the plurality of screens, and display an audition vote image 2330 where audience participation is available on a lower screen among the plurality of screens, as shown in the right view of FIG. 23. Accordingly, the user can participate in the audience participation more easily.

Figure 24:
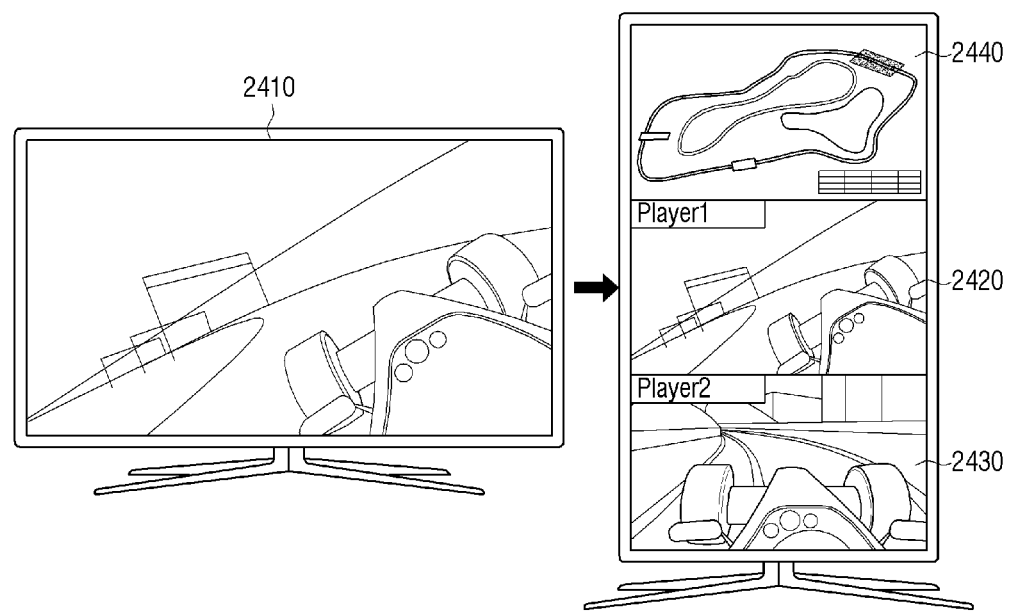

When the image displayed on the display 230 in the horizontal direction is a game image, the controller 290 may display game images of a plurality of participants on the display 230 in the vertical direction simultaneously. Specifically, when an image 2410 of a racing game that is performed by a first participant is displayed as shown in the left view of FIG. 24, and an event in which a second participant attends the same game occurs in the meantime, the controller 290 may control the rotator 235 to rotate the display 230 by a predetermined angle. The controller 290 may control the display 230 to generate a plurality of screens on the rotated display 230, display a reduced size game image 2420 of the game that is performed by the first participant on a middle screen among the plurality of screens, display a game image 2430 of the game that is performed by the second participant on a lower screen among the plurality of screens, and display an image 2440 indicating racing ranking on an upper screen among the plurality of screens. Accordingly, the plurality of users may execute the game content more excitingly through a single screen. On the other hand, in the above exemplary embodiment, the event in which the second participant participates may be an event in which the second participant participates in the same game as that used by the first participant. However, this is merely an example and the event may include various events, such as an event in which the second participant participates in a game room that is used by the first participant through a network. Although upper, middle, and lower screens have been described, it will be understood that the screen location may be changed and exemplary embodiments are not limited to three screens.

According to various exemplary embodiments as described above, the user can be provided with various services related to the image as well as the currently displayed image through the display 230 in the vertical direction.

On the other hand, a size and a location of the image displayed on the display 230 in the vertical direction may be changed according to a user command. In particular, when the size is changed and thus there is an area that is not displayed, the user may search for the area that is not currently displayed using head tracking, hand gesture, eye tracking, etc. The method for searching for an invisible area according to a user command such as head tracking, eye tracking and hand gesture will be explained below with reference to FIGS. 26A and 26B.

On the other hand, the plurality of screens constituting the display 230 in the vertical direction may display images received from a plurality of sources. For example, the upper screen may display a broadcasting content received from a broadcasting station, the middle screen may display a data broadcasting content such as an IP TV, and the lower screen may display a VOD content.

Hereinafter, various exemplary embodiments that may be provided by the display 230 in the vertical direction will be explained.

Figure 25:
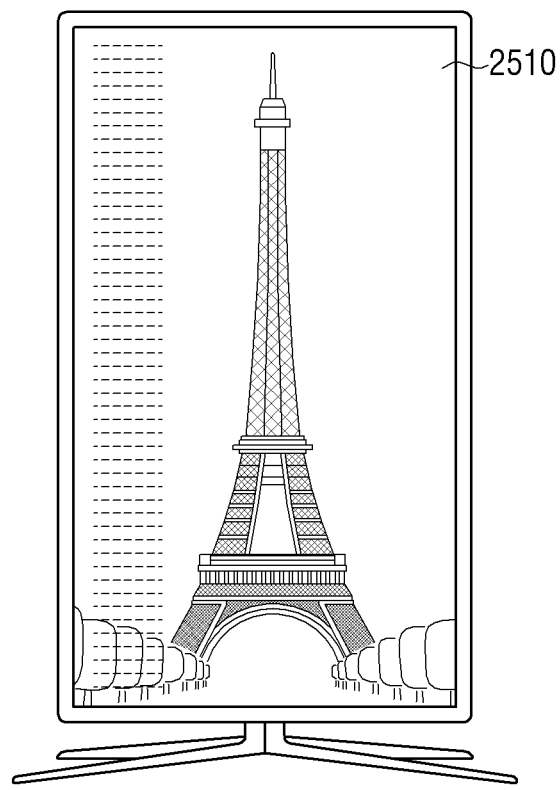

According to an exemplary embodiment, when an appropriate image content for the display 230 in the vertical direction to display is received from an external source, the controller 290 may control the rotator 235 to rotate the display 230 in the horizontal direction to be in the vertical direction, and may display the received image content on the rotated display 230. At this time, the appropriate image content for the display 230 in the vertical direction to display may be an image in which a number of pixels in the vertical direction is larger than a number of pixels in the horizontal direction. Also, when the received image content includes metadata, the controller 290 may display the received image content on the display 230 in the vertical direction and also may display RSS information which is searched based on the metadata. For example, when the received image content is an Eiffel tower image in which the number of pixels in the vertical direction is larger than the number of pixels in the horizontal direction, the controller 290 may display the Eiffel tower image on the display 230 in the vertical direction as shown in FIG. 25. Also, the controller 290 may display RSS information on the Eiffel tower along with the Eiffel tower image using the metadata included in the Eiffel tower image.

Figure 26A:
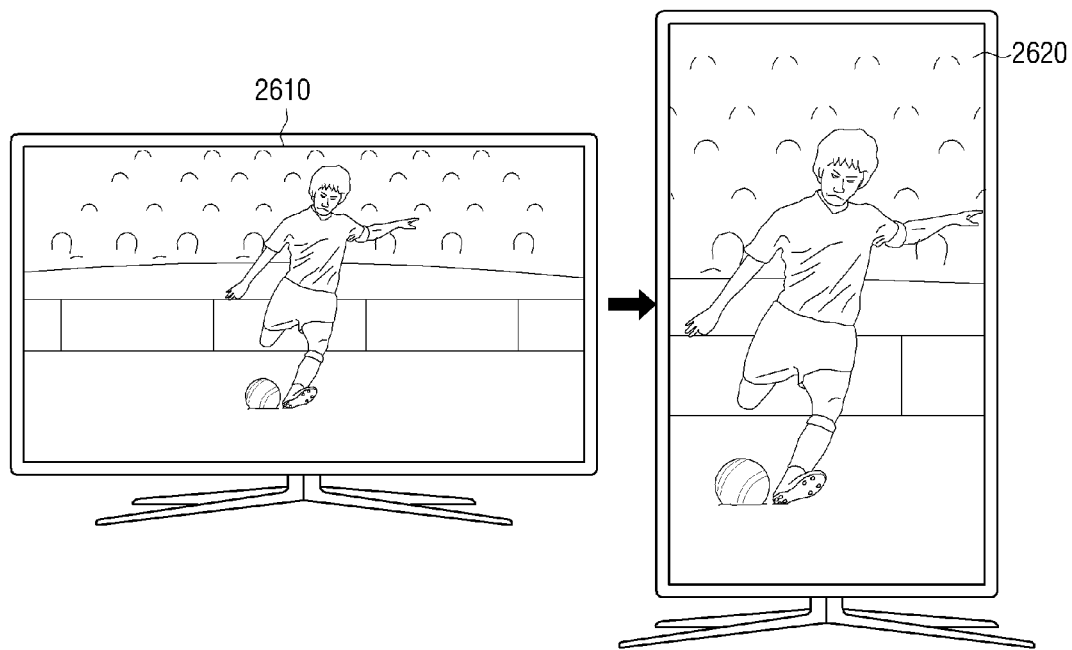
Figure 26B:
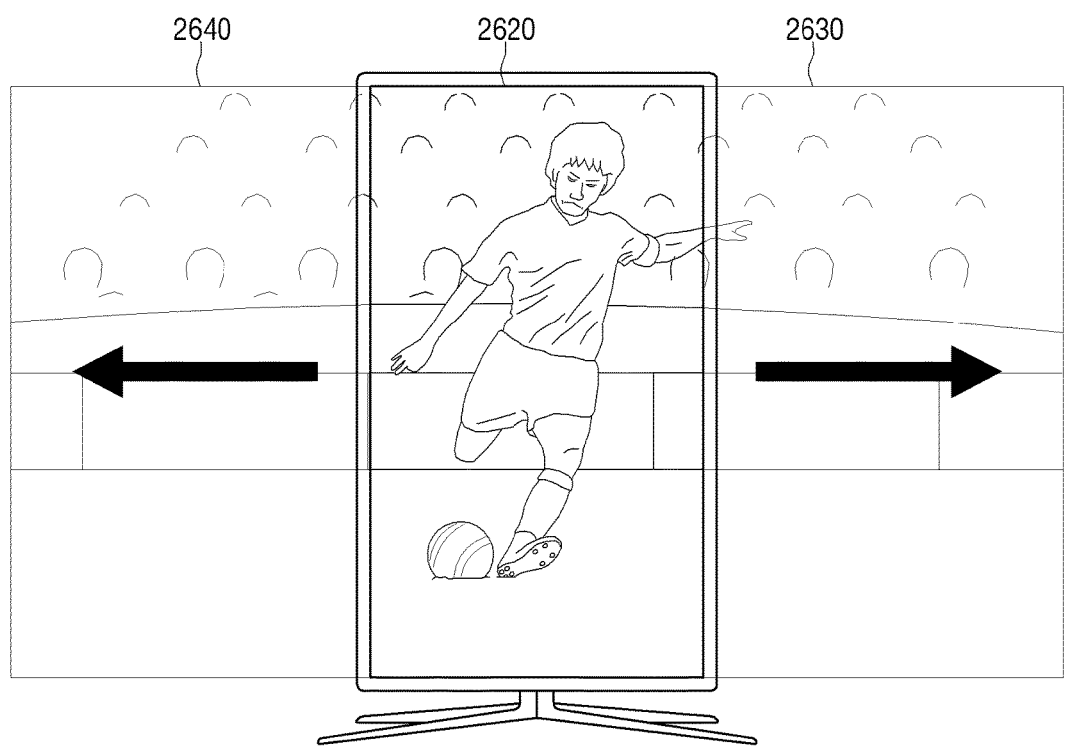

According to another exemplary embodiment, when an event to rotate the display occurs while a soccer image 2610 is displayed on the display 230 in the horizontal direction as shown in the left view of FIG. 26A, the controller 290 may control the rotator 235 to rotate the display 230 to be in the vertical direction, and may display a magnified image 2620 of some areas of the soccer image 2610 on the display 230 in the vertical direction as shown in the right view of FIG. 26A. When the soccer image is displayed on the display 230 in the vertical direction, the controller 290 may magnify a center area of the original soccer image 2610 and may provide the magnified image. However, this is merely an example and an image of a right area 2630 or an image of a left area 2640 may be provided according to a user command as shown in FIG. 26B. At this time, the controller 290 may move the screen to an area that is not currently displayed according to head tracking, hand gesture, or eye tracking, or according to a signal received from a remote control or some other means. For example, when the user's head is rotated to the left while the image is displayed as shown in the right view of FIG. 26A, the controller 290 may sense the head rotation and may provide the image of the left area 2640 to the user according to the direction of the head rotation. Although a soccer image 2640 is depicted, exemplary embodiments are not limited to soccer images.

Figure 27:
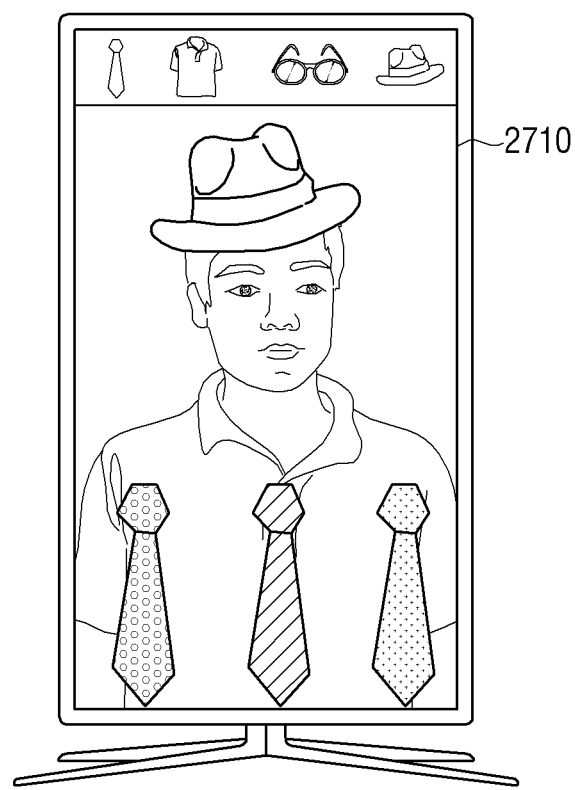

According to still another exemplary embodiment, the display 230 in the vertical direction may provide a mirror function to display the user that is photographed by the camera 281. At this time, the controller 290 may control the display 230 to display the photographed user and also to display a clothes image (for example, a top, a neck tie, a hat, etc.) that the photographed user can virtually wear, as shown in FIG. 27. At this time, the clothes image may be moved on the display screen according to a user command (for example, a touch command). Also, the controller 290 may provide recommended clothes to the user. In particular, the controller 290 may store a specific product among the products included in the broadcasting content that the user has viewed before, and may provide the stored product as the recommended clothes. Cameras 281 may be provided on at least two of the bezels formed on four side surfaces to photograph the user's whole body, although exemplary embodiments are not limited to such.

Figure 28:
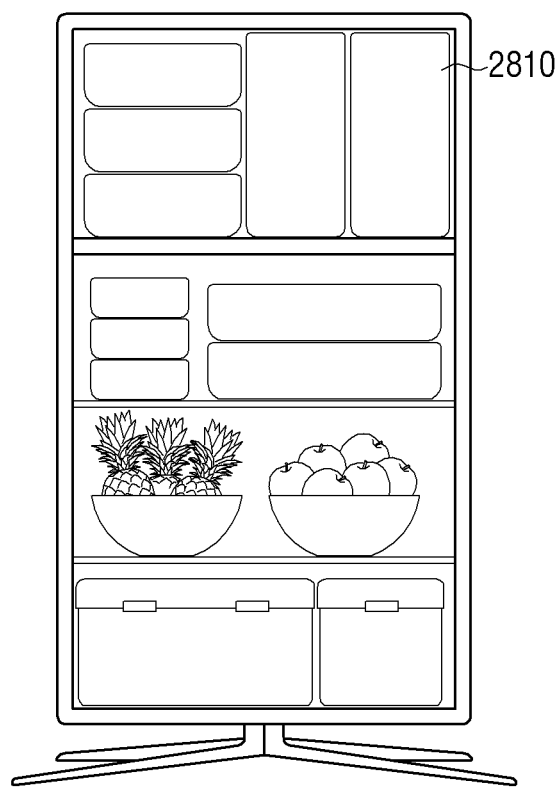
Figure 29:
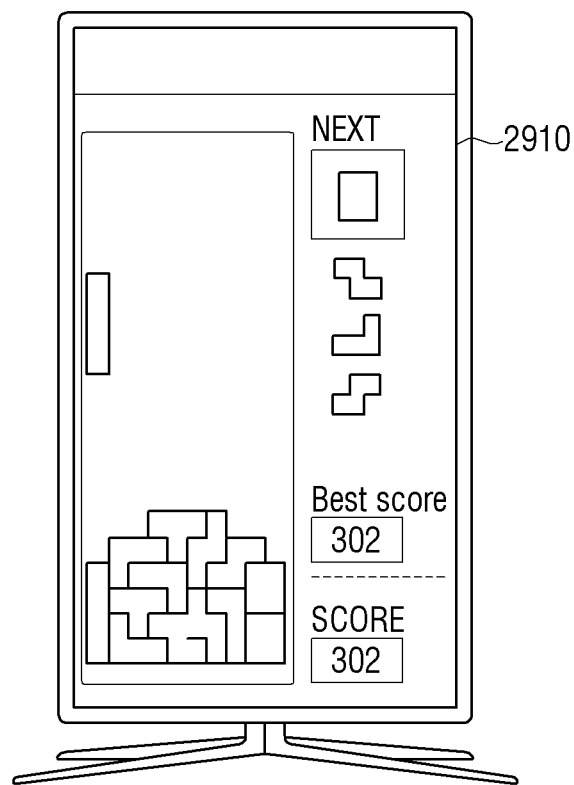

According to still another exemplary embodiment, when an external apparatus is connected to the display apparatus 200, the controller 290 may rotate the display 230 to be in the vertical direction and may display an image provided by the external apparatus. For example, when communication with a refrigerator equipped with a camera is established, the controller 290 may control the rotator 235 to rotate the display 230 to be in the vertical direction, and may display a refrigerator image 2810 received from the refrigerator on the display 230 in the vertical direction as shown in FIG. 28. Although the refrigerator is illustrated as the external apparatus in the above-described exemplary embodiment, this is merely an example and the external apparatus may be implemented by using various external apparatuses such as an air conditioner, a speaker, an interphone, etc. Also, when the display apparatus 200 is connected with the external apparatus, the image displayed by controller 290 may be an image that is provided by the external apparatus and also may be an image for controlling the external apparatus. For example, when an air conditioner is connected with the display apparatus 200, the controller 290 may control the rotator 235 to rotate the display 230 to be in the vertical direction and may display a control screen (not shown) for controlling the air conditioner on the rotated display 230.

According to still another exemplary embodiment, when an external apparatus for providing an image (for example, a DVD player, etc.) is connected, the controller 290 may control the rotator 235 to rotate the display 230 in the horizontal direction to be in the vertical direction to display a currently displayed image and an image that is provided by the newly connected external apparatus altogether. Accordingly, the display 230 in the vertical direction may display the already displayed image and the image that is provided by the newly connected external apparatus simultaneously.

According to still another exemplary embodiment, when a game content executed in the display apparatus 200 is an appropriate game content for the display 230 in the vertical direction to execute, the controller 290 may rotate the display 230 to be in the vertical direction and may execute the game content. For example, when an event to execute the Tetris game occurs, the controller 290 may control the rotator 235 to rotate the display 230 to be in the vertical direction and may display a Tetris game image 2910 on the display 230 in the vertical direction.

Figure 30:
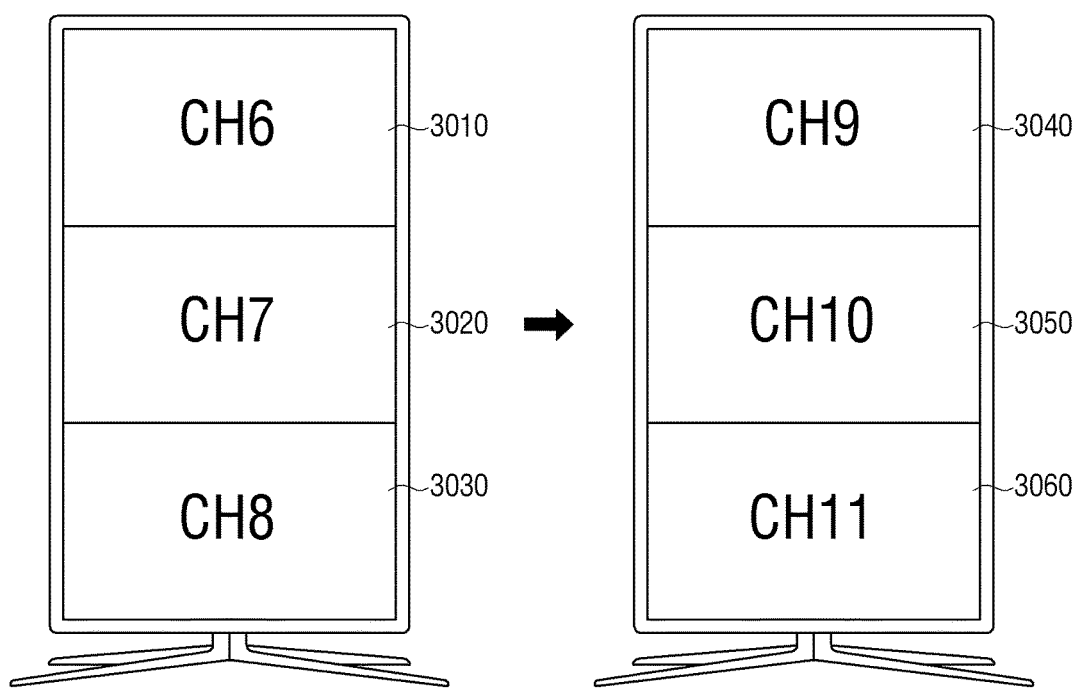

According to still another exemplary embodiment, when a channel changing command is input while the display 230 in the vertical direction displays a plurality of broadcasting images, the controller 290 may control the display 230 to change the plurality of broadcasting images and display a plurality of broadcasting images of next channels. For example, when a channel up command is input while broadcasting images of 6th to 8th channels are displayed as shown in the left view of FIG. 30, the controller 290 may change the broadcasting images of the 6th to 8th channels displayed on the display 230 in the vertical direction into broadcasting images of 9th to 11th channels and may display the broadcasting images. Accordingly, the user can search for various channels more swiftly.

Figure 31:
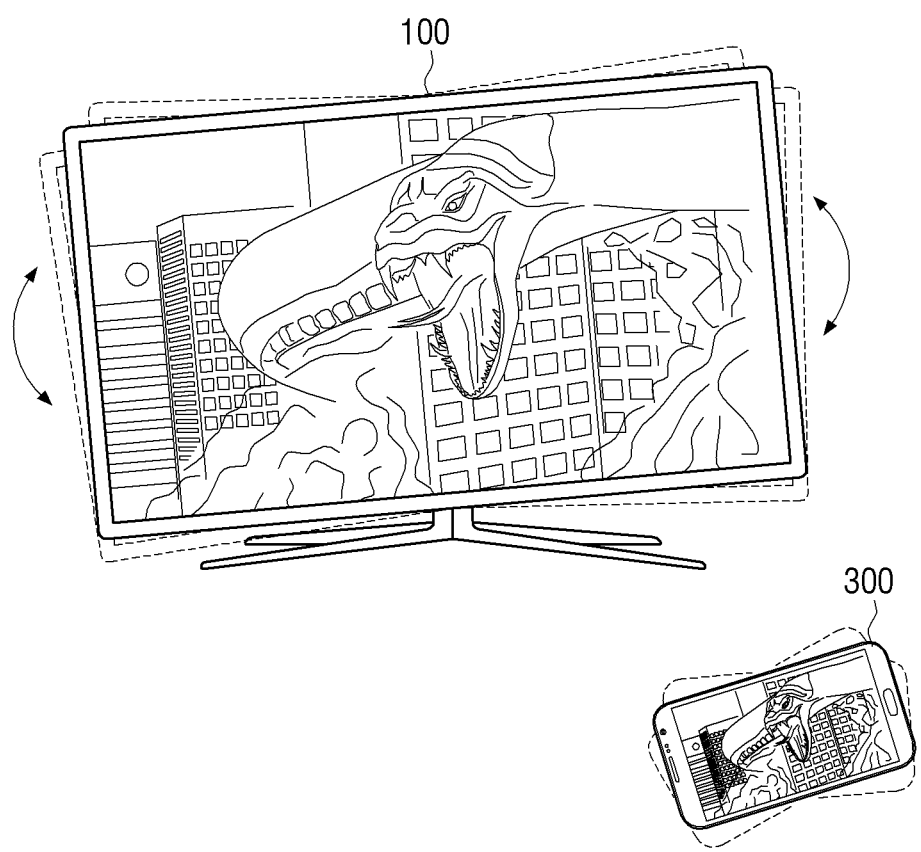

According to still another exemplary embodiment, the controller 290 may control the rotator 235 to rotate the display 230 according to a motion of the mobile apparatus 300. Specifically, when the mobile apparatus 300 controls a game that is executed in the display apparatus 200, the controller 290 may control the rotator 235 to rotate the display 230 on which the game image is displayed according to rotation of the mobile apparatus 300, as shown in FIG. 31. Accordingly, the user can enjoy the game content more realistically.

Figure 32:
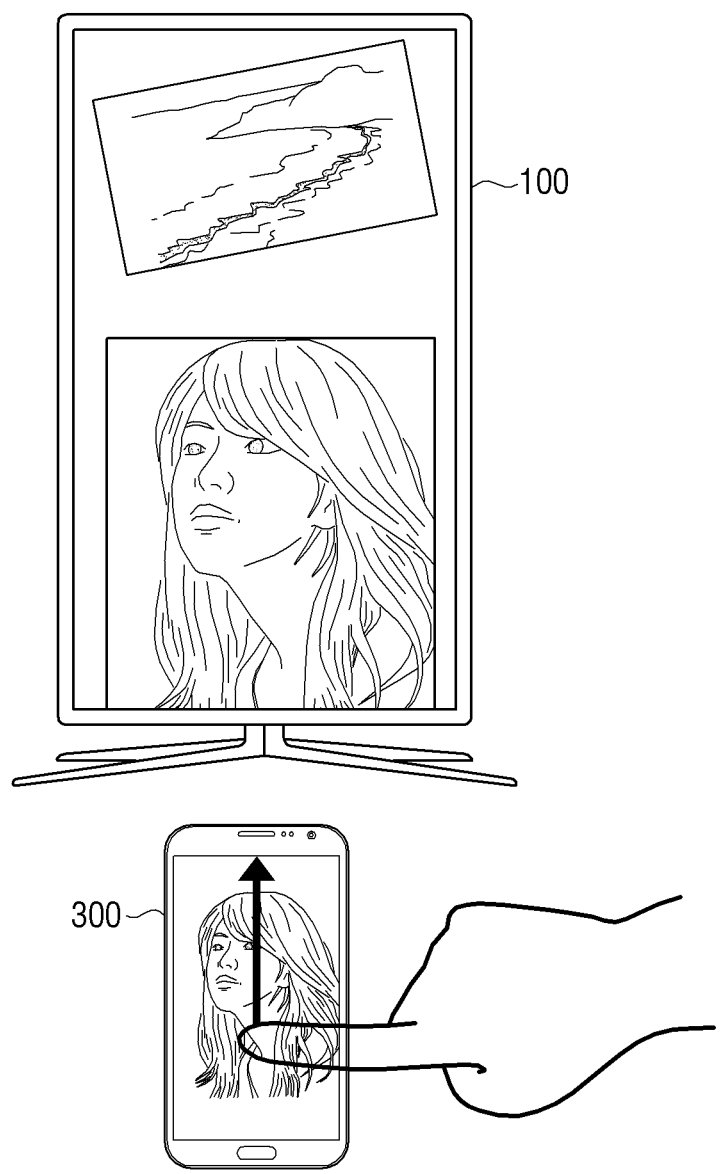

According to still another exemplary embodiment, the controller 290 may display a photo content that is received from an external source on the display 230 in the vertical direction. In particular, when a user command to drag up a photo content displayed on the mobile apparatus 300 is input as shown in the lower view of FIG. 32, the mobile apparatus 300 transmits the photo content for which the user command to drag is input to the display apparatus 200, and the controller 290 may display the received photo content to move up from the bottom on the display 230 in the vertical direction. Accordingly, the user may transmit the image displayed on the mobile apparatus 300 to the display apparatus 200 through an intuitive interaction and display the image on the display apparatus 200.

Figure 33:
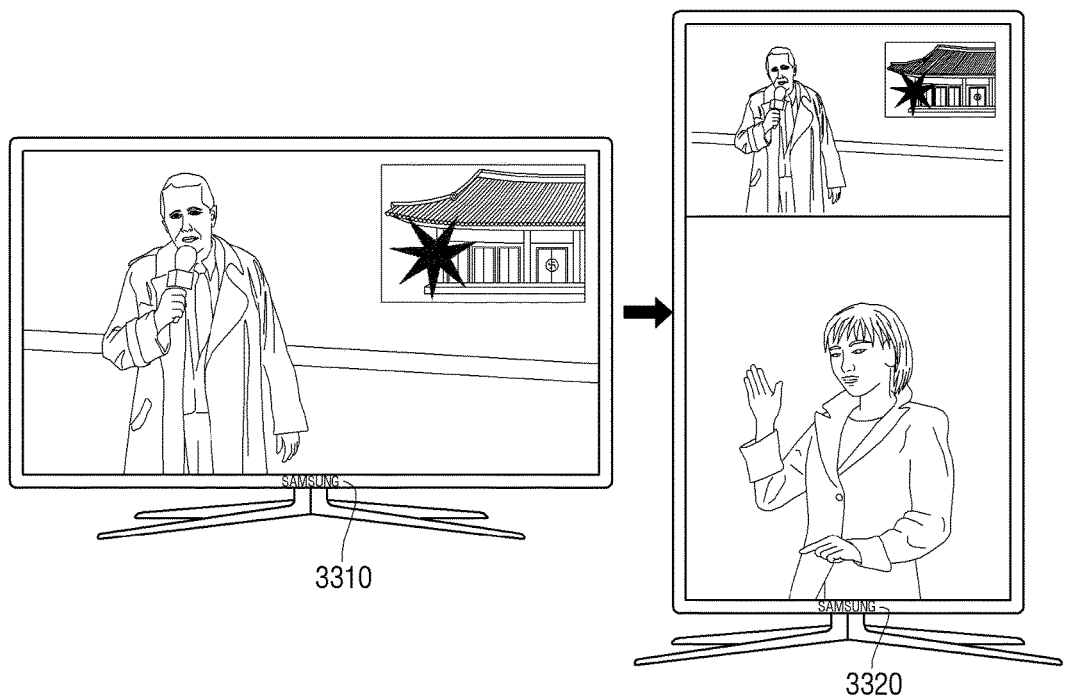

According to still another exemplary embodiment, the controller 290 may display a product name or a company name on a lower end of the display 230 regardless of whether the display 230 is rotated or not. Specifically, when the display 230 is placed in the horizontal direction, the controller 290 may display a company name 3310 on the lower bezel. As shown on the left of FIG. 33, when the display 230 is rotated clockwise to be placed in the vertical direction, the controller 290 may display a product name 3320 on the lower bezel of the display 230 in the vertical direction rather than displaying the company name on the left bezel that was used to display the company name on the display 230 in the horizontal direction. At this time, the bezel may display the product name using an LED window that can be turned on or off. Accordingly, even when the display is rotated, the product name or the company name may always be displayed on the lower end of the display 230.

According to still another exemplary embodiment, the controller 290 may control the display 230 to generate a plurality of screens on the display 230 in the vertical direction, display a broadcasting image on one of the plurality of screens, and display a web browsing image on another screen among the plurality of screens, such that multi-tasking is performed.

According to still another exemplary embodiment, when a plurality of users are sensed while the display 230 is placed in the horizontal direction, the controller 290 may control the rotator 235 to rotate the display 230 in the horizontal direction to be in the vertical direction. Specifically, when the plurality of users are sensed using the camera, etc. provided in the display apparatus 200 or a plurality of portable terminals are connected to the display apparatus 200, the controller 290 may control the rotator 235 to rotate the display 230 in the horizontal direction to be in the vertical direction. Also, the controller 290 may control the display 230 to generate a plurality of screens on the display 230 in the vertical direction, and display a plurality of images on the plurality of screens, respectively. At this time, a sound corresponding to one of the plurality of images displayed on the plurality of screens may be output through a speaker, and sounds corresponding to the other images among the plurality of images may be transmitted to external terminals through various wire/wireless communications (for example, LTE, Wi-Fi, Bluetooth, etc.).

Figure 34:
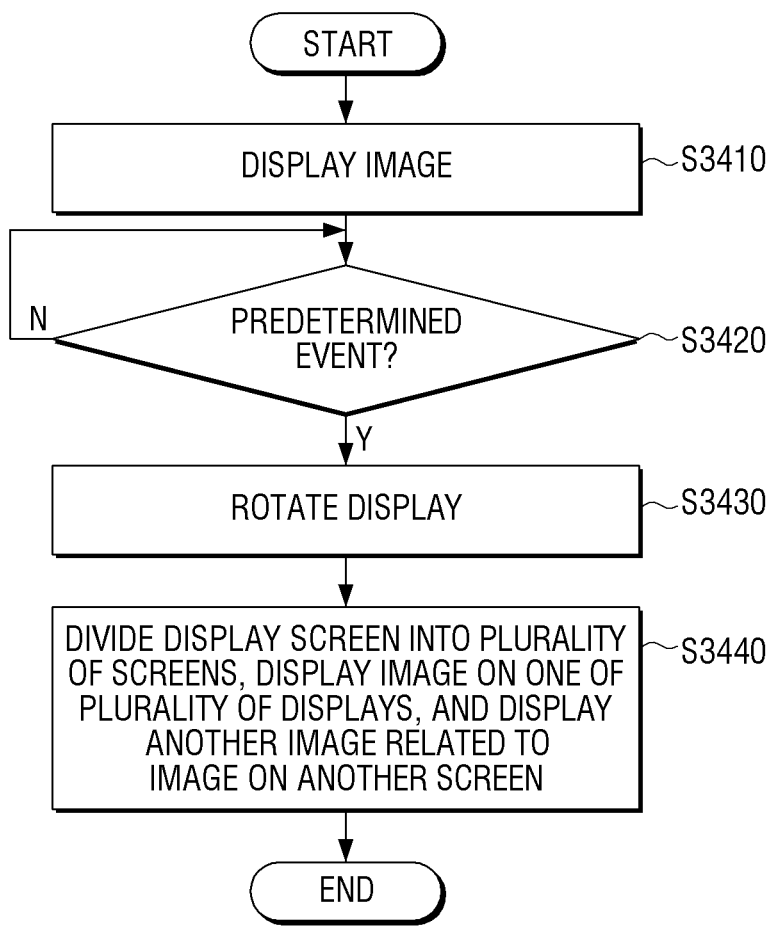
FIG. 34 is a flowchart illustrating a control method of a display apparatus according to an exemplary embodiment.

Hereinafter, a control method of a display apparatus 100 according to an exemplary embodiment will be explained with reference to FIG. 34.

First, the display apparatus 100 displays an image (S3410). Specifically, the display apparatus 100 may display the image through the display 110 in the horizontal direction.

The display apparatus 100 determines whether a predetermined event occurs or not (S3420). At this time, the predetermined event may be an event to rotate the display 110, and may be an event in which the user directly inputs a user interaction or may be an event in which the display apparatus 100 senses a predetermined condition without receiving user input. The event in which the user directly inputs the user interaction may include an event in which a predetermined user interaction is sensed in a predetermined area of a remote control apparatus, an event in which a predetermined user motion is photographed by a camera, an event in which a predetermined user voice is input through a microphone, and an event in which a predetermined user touch is input to a touch sensor provided on a bezel of the display 110. The event in which the display apparatus 100 senses the predetermined condition without receiving user input may include an event in which a content of a specific content is displayed on the mobile apparatus 300 when a mirroring function is performed, an event in which a specific game is executed, an event in which a user's motion is sensed in a specific mode (for example, a sleep mode), and an event in which the display apparatus 100 is connected with an external apparatus (for example, a refrigerator, etc.)

When the predetermined event occurs (S3420—Y), the display apparatus 100 rotates the display 110 (S3430). Specifically, the display apparatus 100 may rotate the display 110 such that the display 110 in the horizontal direction becomes the display 110 in the vertical direction.

Also, the display apparatus 100 generates a plurality of screens on the display 110 and displays an image on one of the plurality of screens, and display another image related to the image on another screen (S3440). Specifically, when the display 110 is rotated, the display apparatus 100 may display not only the already displayed image but also an image related to the already displayed image on the display 110 in the vertical direction simultaneously, as described in FIGS. 16 to 24.

As described above, the display apparatus 100 rotates the display 110 and displays not only the currently received image but also another image related to the currently received image, so that the user can be provided with various services related to the current image. Although as described the another image is related to the already displayed image, exemplary embodiments are not limited to such and the another image may be unrelated to the already displayed image.

Hereinafter, a method for providing a different operation mode according to a rotation angle of the display 230 according to another exemplary embodiment will be explained.

Figure 35:
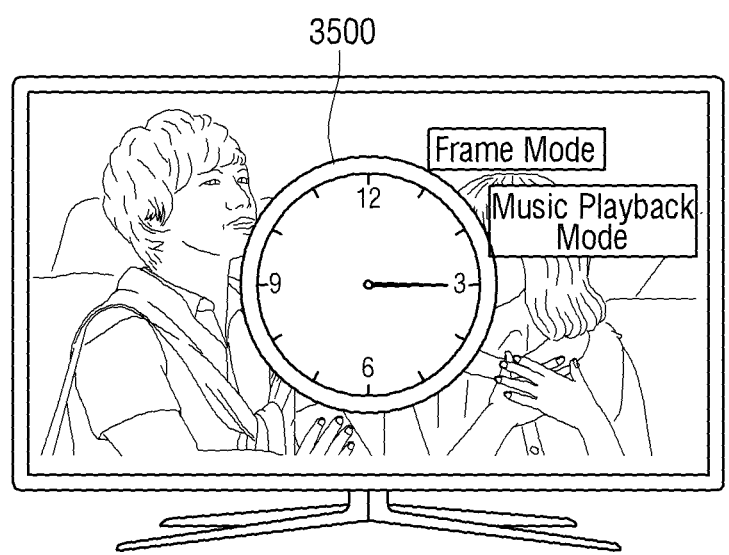
FIGS. 35 to 37 are views to illustrate a method for providing a different operation mode according to a rotation angle according to another exemplary embodiment.

When a predetermined user command is input while the display 230 is placed in the horizontal direction, the controller 290 may display a UI for guiding an operation mode on the display screen. Specifically, when a user command to enter a rotation mode (for example, a command to select a button provided on a remote control apparatus) is input while the display 230 is placed in the horizontal direction, the controller 290 may control the display 230 to display a clock-like UI 3500 as shown in FIG. 35. At this time, the clock-like UI 3500 may display a guide phrase guiding an operation mode according to a rotation angle. For example, when the display 230 is rotated by 30 degrees in the counter clockwise direction, the clock-like UI 3500 may display a guide phrase informing that the operation mode is converted into a music playback mode, and, when the display 230 is rotated by 36 degrees in the counter clockwise direction, the clock-like UI 3500 may display a guide phrase informing that the operation mode is converted into an album mode.

Also, the clock-like UI 3500 may move an indicator according to a user interaction. For example, when a user's rotation command corresponding to a 30-degree angle is input while the indicator is located in a 3 o'clock direction, the indicator included in the clock-like UI 3500 may be moved to a 2 o'clock direction. Also, when a user's rotation command corresponding to a 60-degree angle is input while the indicator is located in the 3 o'clock direction, the indicator included in the clock-like UI 3500 may be moved to a 1 o'clock direction. That is, the user can intuitively identify a rotation value of the user's rotation command which is currently input through the clock-like UI 3500.

Figure 36:
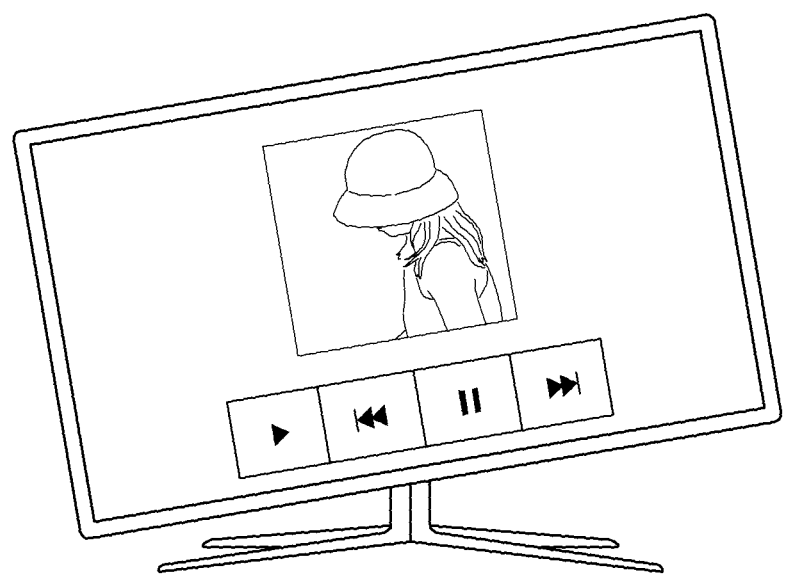

When the user's rotation command corresponding to the 30-degree angle is input while the clock-like UI 3500 is displayed, the controller 290 may convert the operation mode into the music playback mode, display a screen for playing back the music on the display 230 as shown in FIG. 36, and may playback the music through the audio outputter 240.

Figure 37:
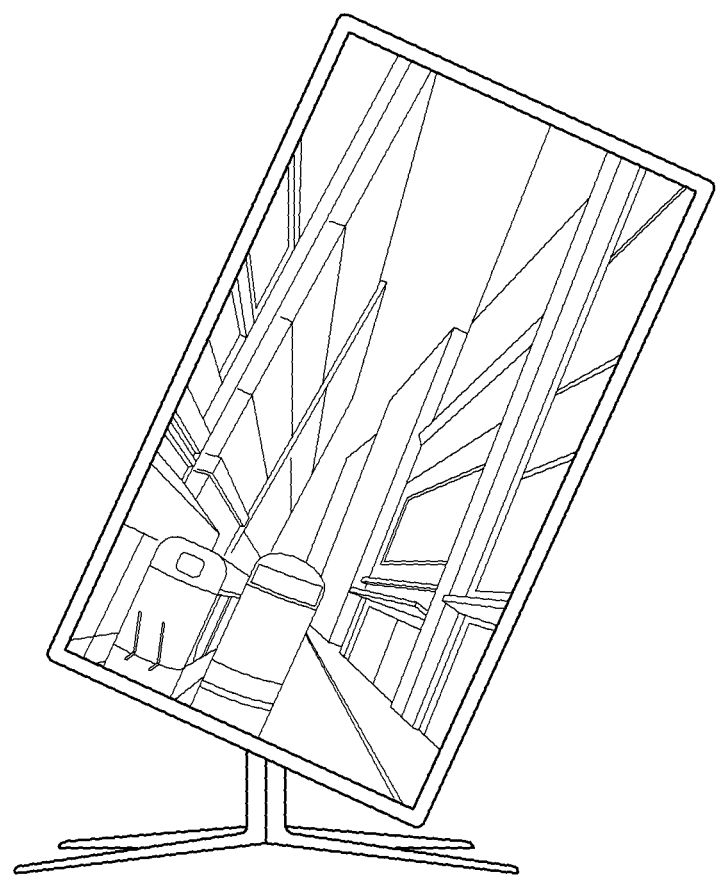

When the user's rotation command corresponding to the 60-degree angle is input while the clock-like UI 3500 is displayed, the controller 290 may convert the operation mode into the album mode, and display a predetermined image content (for example, a famous painting) on the display 230 as shown in FIG. 37.

As described above, a different operation mode is provided according to the rotation angle, so that the user can perform various functions through a single display apparatus and a design effect can be obtained.

Meanwhile, although the aforementioned exemplary embodiment has explained that a display apparatus is rotated to be in the vertical direction from the horizontal direction, this is merely one of embodiments, and an exemplary embodiment of rotating a display apparatus to be in the horizontal direction from the vertical direction may be employed. For example, when a display apparatus is rotated to be in the vertical direction, and a predetermined user command is inputted while a plurality of images are displayed through a plurality of screens, a display apparatus may rotate the display apparatus in the vertical direction to be in the horizontal direction, and display one of the plurality of images which are displayed on the plurality of screens.

A program code for performing the control method according to the above-described various exemplary embodiments may be stored in a non-transitory computer readable medium. The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display configured to display an image;
a rotator configured to rotate the display; and
a controller configured to control the rotator to rotate the display in response to a predetermined event occurring, and control the display to generate a plurality of screens on the rotated display, display a first image on one of the plurality of screens, and display at least one different image on another screen among the plurality of screens,
wherein, on the condition that the predetermined event occurs while the display displays the first image, the controller is further configured to control the display to reduce a size of the first image displayed on the display and maintain horizontality of the first image and increase a size of at least one different image while the display is rotated.

2. The apparatus as claimed in claim 1, wherein the controller is further configured to control the display to display the first image on one of the plurality of screens, and display a different image including information related to the first image on another screen among the plurality of screens.

3. The apparatus as claimed in claim 2, wherein the information related to the first image comprises at least one of detailed information on the first image, detailed information on a character included in the first image, and shopping information on a product shown in the first image.

4. The apparatus as claimed in claim 1, wherein the controller is further configured to control the display to display the first image of an image content from a first camera on one of the plurality of screens, and display a second image which of the image content from a second camera on another screen among the plurality of screens.

5. The apparatus as claimed in claim 2, wherein the controller is further configured to control the rotator to rotate the display in response to the predetermined event occurs only while the display displays the first image, and
wherein on a condition that the first image is a sports game image regarding a sports game, the controller is further configured to control the display to display the sports game image on a first screen among the plurality of screens, display real-time analysis information on the sports game on a second screen among the plurality of screens, and display SNS (Social Network Service) information on the sports game on a third screen among the plurality of screens.

6. The apparatus as claimed in claim 2, wherein the controller is further configured to control the display to display the first image on a first screen among the plurality of screens, display the chatting screen on a second screen among the plurality of screens, and display a video call screen on a third screen among the plurality of screens.

7. The apparatus as claimed in claim 1, wherein the controller is further configured to control the display to display the first image on one of the plurality of screens, and display a sign language image corresponding to the first image on another screen among the plurality of screens.

8. The apparatus as claimed in claim 1, wherein the controller is further configured to control the rotator to rotate the display in response to the predetermined event occurs only while the display displays the first image, and
wherein on a condition that the first image is a cooking program image regarding a cooking program, the controller is further configured to control the display to display the cooking program image on one of the plurality of screens, and display recipe information corresponding to the cooking program on another screen among the plurality of screens.

9. The apparatus as claimed in claim 1, wherein the controller is further configured to control the rotator to rotate the display in response to the predetermined event occurs only while the display displays the first image, and
wherein on a condition that the first image is a broadcast program image regarding a broadcasting program where audience participation is available, the controller is further configured to control the display to display the broadcast program image on one of the plurality of screens, and display an audience participation image on another screen among the plurality of screens.

10. The apparatus as claimed in claim 1, wherein the controller is further configured to control the rotator to rotate the display in response to the predetermined event occurs only while the display displays the first image, and
wherein on a condition that the displayed image is a game image regarding a video game, and the predetermined event comprises a second participant beginning participation in the video game while a first participant participates in the video game, the controller is further configured to control the rotator to rotate the display by an angle of a predetermined degree, and control the display to generate a plurality of screens on the rotated display, display a game image of the game which is performed by the first participant on one of the plurality of screens, and display a game image of the game which is performed by the second participant on another screen among the plurality of screens.

11. The apparatus as claimed in claim 1, wherein the plurality of screens are arranged in a vertical direction, and a position and a size of the plurality of screens are set by a user.

12. The apparatus as claimed in claim 1, wherein in response to a predetermined event occurring while the display displays the first image, the controller is further configured to control the rotator to rotate the display by an angle of a predetermined degree.

13. The apparatus as claimed in claim 12, wherein in response to the predetermined event occurring, the controller is further configured to control the rotator to rotate the display by 90 degrees.

14. The apparatus as claimed in claim 1, wherein the controller is further configured to control the rotator to rotate the display in response to the predetermined event occurs only while the display displays the first image.

15. The apparatus as claimed in claim 1, wherein the controller is further configured to control the display to display the at least one different image on another screen among the plurality of screens according to attributes of the first image.

16. The apparatus as claimed in claim 1, wherein the at least one different image is related to the first image.

17. A method for controlling a display apparatus comprising:
rotating a display in response to a predetermined event occurring; and
generating a plurality of screens on the rotated display, displaying a first image on one of the plurality of screens, and displaying at least one different image on another screen among the plurality of screens according to attributes of the image,
wherein, on the condition that the predetermined event occurs while the display displays the first image, the displaying comprises reducing a size of the first image which is displayed on the display and maintaining the horizontality of the first image and increasing a size of at least one different image while the display is rotated.

18. The method as claimed in claim 17, wherein the displaying comprises displaying the first image on one of the plurality of screens, and displaying a different image including information related to the first image on another screen among the plurality of screens.

19. The method as claimed in claim 18, wherein the information related to the first image comprises at least one of detailed information on the first image, detailed information on a character included in the first image, and shopping information on a product which shown in the first image.

20. The method as claimed in claim 17, wherein the displaying comprises displaying the first image of an image content from a first camera on one of the plurality of screens, and displaying a second image of the image content from a second camera on another screen among the plurality of screens.

21. The method as claimed in claim 17, wherein the rotating the display in response to the predetermined event occurs only while the display displays the first image, and
wherein on a condition that the displayed image is a sports game image regarding a sports game, the displaying comprises displaying the sports game image on a first screen among the plurality of screens, displaying real-time analysis information on the sports game on a second screen among the plurality of screen, and displaying SNS (Social Network Service) information on the sports game on a third screen among the plurality of screens.

22. The method as claimed in claim 17, wherein the displaying comprises displaying the first image on the first screen among the plurality of screens, displaying a chatting image on the second screen among the plurality of screens, displaying a video call image on the third screen among the plurality of screens.

23. The method as claimed in claim 17, wherein the displaying comprises displaying the first image on one of the plurality of screens, and displaying a sign language image corresponding to the first image on another screen among the plurality of screens.

24. The method as claimed in claim 17, wherein the rotating the display in response to the predetermined event occurs only while the display displays the first image, and
wherein on a condition that the displayed image is a cooking program image regarding a cooking program, the displaying comprises displaying the cooking program image on one of the plurality of screens, and displaying recipe information corresponding to the cooking program on another screen among the plurality of screens.

25. The method as claimed in claim 17, wherein the rotating the display in response to the predetermined event occurs only while the display displays the first image, and
wherein on a condition that the first image is a broadcast program image regarding a broadcasting program where audience participation is available, the displaying comprises displaying the broadcast program image on one of the plurality of screens, and displaying an audience participation image on another screen among the plurality of screens.

26. The method as claimed in claim 17, wherein the rotating the display in response to the predetermined event occurs only while the display displays the first image, and
wherein on a condition that the displayed image is a game image regarding a video game, and the predetermined event comprises a second participant joining in the video game while a first participant performs a game, the rotating comprises rotating the display by an angle of a predetermined degree, and the displaying comprises generating a plurality of screens on the rotated display, displaying a game image in which the first participant participates on one of the plurality of screens, and displaying a game image in which the second participant participates on another screen among the plurality of screens.

27. The method as claimed in claim 17, wherein the plurality of screens are arranged in a vertical direction, and a position and a size of the plurality of screens are set by a user.

28. The method as claimed in claim 17, wherein the rotating the display in response to the predetermined event occurs only while the display displays the first image, and
wherein the rotating comprises rotating the display by an angle of a predetermined degree.

29. The method as claimed in claim 28, wherein the rotating comprises rotating the display by 90 degrees.

30. The method as claimed in claim 17, wherein the rotating the display in response to the predetermined event occurs only while the display displays the first image.

31. The method as claimed in claim 17, wherein the displaying the at least one different image on another screen among the plurality of screens occurs according to attributes of the first image.

32. The method as claimed in claim 17, wherein the at least one different image is related to the first image.

33. A display apparatus comprising:
a display configured to display an image;
a rotator configured to rotate the display;
a user interface unit configured to receive a user interaction; and
a controller configured to control the rotator to rotate the display in response to a predetermined user interaction received by the user interface unit, and control the display to generate a plurality of screens on the rotated display, display a first image on one of the plurality of screens, and display at least one different image on another screen among the plurality of screens,
wherein the controller is further configured to, in response to the predetermined user interaction received by the user interface unit, control the display to reduce a size of the first image displayed on the display and maintain horizontality of the first image and increase a size of at least one different image while the display is rotated.

34. The apparatus as claimed in claim 33, wherein the controller is further configured to control the rotator to rotate the display in response to the predetermined user interaction received by the user interface unit only while the display displays the first image.

35. The apparatus as claimed in claim 33, wherein the controller is further configured to control the display to display the at least one different image on another screen among the plurality of screens according to attributes of the first image.

36. The apparatus as claimed in claim 33, wherein the at least one different image is related to the first image.

37. A method for controlling a display apparatus comprising:
rotating the display in response to receiving a predetermined user interaction; and
generating a plurality of screens on the rotated display, displaying a first image on one of the plurality of screens, and displaying at least one different image on another screen among the plurality of screens,
wherein, on the condition that the predetermined event occurs while the display displays the first image, the displaying comprises reducing a size of the first image which is displayed on the display and maintaining the horizontality of the first image and increasing a size of at least one different image while the display is rotating.

38. The method as claimed in claim 37, wherein the rotating the display in response to receiving predetermined user interaction only while the display displays the first image.

39. The method as claimed in claim 37, wherein the displaying the at least one different image on another screen among the plurality of screens occurs according to attributes of the first image.

40. The method as claimed in claim 37, wherein the at least one different image is related to the first image.

* * * * *